US012756635B2

(12) United States Patent
Li et al.

(10) Patent No.: US 12,756,635 B2
(45) Date of Patent: Oct. 6, 2026

(54) TECHNIQUES FOR MACHINE LEARNING SCHEME CHANGING BASED AT LEAST IN PART ON DYNAMIC NETWORK CHANGES

(71) Applicant: QUALCOMM Incorporated, San Diego, CA (US)

(72) Inventors: Qiaoyu Li, Beijing (CN); Wooseok Nam, San Diego, CA (US); Mahmoud Taherzadeh Boroujeni, San Diego, CA (US); Tao Luo, San Diego, CA (US); Mohamed Fouad Ahmed Marzban, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 18/728,956

(22) PCT Filed: Apr. 1, 2022

(86) PCT No.: PCT/CN2022/084741

§ 371 (c)(1),
(2) Date: Jul. 15, 2024

(87) PCT Pub. No.: WO2023/184463

PCT Pub. Date: Oct. 5, 2023

(65) Prior Publication Data

US 2025/0168079 A1 May 22, 2025

(51) Int. Cl.
*H04L 41/16* (2022.01)
*H04B 7/06* (2006.01)
*H04B 17/318* (2015.01)

(52) U.S. Cl.
CPC ........... *H04L 41/16* (2013.01); *H04B 7/0626* (2013.01); *H04B 7/06964* (2023.05); *H04B 17/328* (2023.05)

(58) Field of Classification Search
None
See application file for complete search history.

(56) References Cited

U.S. PATENT DOCUMENTS

2014/0222996 A1 8/2014 Vasseur et al.
2019/0103954 A1* 4/2019 Lee .................... H04W 52/146
(Continued)

FOREIGN PATENT DOCUMENTS

WO WO-2019172813 A1 9/2019
WO 2021107488 A1 6/2021
(Continued)

OTHER PUBLICATIONS

International Search Report and Written Opinion—PCT/CN2022/084741—ISA/EPO—Nov. 30, 2022.
(Continued)

*Primary Examiner* — June Sison
(74) *Attorney, Agent, or Firm* — Harrity & Harrity LLP/QUALCOMM Incorporated

(57) ABSTRACT

Various aspects of the present disclosure generally relate to wireless communication. In some aspects, a first network node may receive assistance information indicating an occurrence of at least one dynamic network change, wherein the at least one dynamic network change corresponds to a change from a first network state to a second network state, wherein a first machine learning scheme is associated with the first network state, and wherein the first machine learning scheme includes a machine learning model for generating a prediction associated with a first serving cell and/or a machine tearning parameter associated with the machine tearning model. The first network node may identify, based at least in part on the assistance information, a second machine learning scheme associated with the second network state, and may perform a wireless communication
(Continued)

400 based at least in part on the second machine learning scheme. Numerous other aspects are described.

30 Claims, 7 Drawing Sheets

(56) References Cited

U.S. PATENT DOCUMENTS

| | | | | |
|---|---|---|---|---|
| 2019/0268894 | A1 | 8/2019 | Cho et al. | |
| 2020/0259575 | A1* | 8/2020 | Bai | H04B 7/0862 |
| 2020/0412417 | A1* | 12/2020 | Calzolari | H04B 17/318 |
| 2021/0091838 | A1* | 3/2021 | Bai | H04B 7/0639 |
| 2021/0289406 | A1* | 9/2021 | Feki | H04L 41/0823 |
| 2021/0328630 | A1 | 10/2021 | Ryu et al. | |
| 2021/0345134 | A1 | 11/2021 | Ottersten et al. | |
| 2022/0104033 | A1* | 3/2022 | Ly | H04L 67/01 |
| 2022/0104034 | A1 | 3/2022 | Sana et al. | |
| 2024/0063962 | A1* | 2/2024 | Lin | H04L 5/0094 |
| 2024/0107347 | A1* | 3/2024 | Pirmagomedov | H04L 1/0023 |
| 2025/0193758 | A1* | 6/2025 | Huang | H04B 17/346 |
| 2025/0301285 | A1* | 9/2025 | Wang | H04L 41/16 |
| 2025/0324393 | A1* | 10/2025 | Abedini | H04B 17/328 |
| 2026/0040175 | A1* | 2/2026 | Abdelhady Mahmoud | H04W 36/13 |

FOREIGN PATENT DOCUMENTS

| | | |
|---|---|---|
| WO | WO-2022000365 A1 | 1/2022 |
| WO | WO-2022006814 | 1/2022 |

OTHER PUBLICATIONS

Supplementary European Search Report—EP22934300—Search Authority—Munich—Jan. 9, 2026.

Wen C-K., et al., "Deep Learning for Massive Mimo Csi Feedback", IEEE Wireless Communication Letters, arXiv: 1712.08919v4 [cs. IT], Apr. 23, 2018, pp. 1-5.

* cited by examiner

TECHNIQUES FOR MACHINE LEARNING SCHEME CHANGING BASED AT LEAST IN PART ON DYNAMIC NETWORK CHANGES

CROSS-REFERENCE TO RELATED APPLICATION

This Patent Application is a 371 national stage of PCT Application No. PCT/CN2022/084741, filed on Apr. 1, 2022, entitled "TECHNIQUES FOR MACHINE LEARNING SCHEME CHANGING BASED AT LEAST IN PART ON DYNAMIC NETWORK CHANGES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for machine learning scheme changing based at least in part on dynamic network changes.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors coupled to the memory. The one or more processors may be configured to receive assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of a machine learning model for generating a prediction associated with a first serving cell based at least in part on at least one reference signal associated with a second serving cell or a machine learning parameter associated with the machine learning model. The one or more processors may be configured to identify, based at least in part on the assistance information, a second machine learning scheme, from the plurality of machine learning schemes, wherein the second machine learning scheme is associated with the second network state. The one or more processors may be configured to perform a wireless communication based at least in part on the second machine learning scheme.

Some aspects described herein relate to a first network node for wireless communication. The first network node may include a memory and one or more processors coupled to the memory. The one or more processors may be configured to transmit, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of a machine learning model for generating a prediction associated with a first serving cell based at least in part on at least one reference signal associated with a second serving cell or a machine learning parameter associated with the machine learning model. The one or more processors may be configured to transmit, to the second network node, assistance information indicating an occurrence of a dynamic network change of a set of specified dynamic network changes, wherein the dynamic network change corresponds to a change from the first network state to the second network state.

Some aspects described herein relate to a method of wireless communication performed by a first network node. The method may include receiving assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of a machine learning model for generating a prediction associated with a first serving cell based at least in part on at least one reference signal associated with a second serving cell or a machine learning parameter associated with the machine learning model. The method may include identifying, based at least in part on the assistance information, a second machine learning scheme, from the plurality of machine learning schemes, wherein the second machine learning scheme is associated with the second network state. The method may include performing a wireless communication based at least in part on the second machine learning scheme.

Some aspects described herein relate to a method of wireless communication performed by a first network node. The method may include transmitting, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of a machine learning model for generating a prediction associated with a first serving cell based at least in part on at least one reference signal associated with a second serving cell or a machine learning parameter associated with the machine learning model. The method may include transmitting, to the second network node, assistance information indicating an occurrence of a dynamic network change of a set of specified dynamic network changes, wherein the dynamic network change corresponds to a change from the first network state to the second network state.

Some aspects described herein relate to a non-transitory computer-readable medium that stores a set of instructions for wireless communication by a first network node. The set of instructions, when executed by one or more processors of the first network node, may cause the first network node to receive assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of a machine learning model for generating a prediction associated with a first serving cell based at least in part on at least one reference signal associated with a second serving cell or a machine learning parameter associated with the machine learning model. The set of instructions, when executed by one or more processors of the first network node, may cause the first network node to identify, based at least in part on the assistance information, a second machine learning scheme, from the plurality of machine learning schemes, wherein the second machine learning scheme is associated with the second network state. The set of instructions, when executed by one or more processors of the first network node, may cause the first network node to perform a wireless communication based at least in part on the second machine learning scheme.

Some aspects described herein relate to a non-transitory computer-readable medium that stores a set of instructions for wireless communication by a first network node. The set of instructions, when executed by one or more processors of the first network node, may cause the first network node to transmit, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of a machine learning model for generating a prediction associated with a first serving cell based at least in part on at least one reference signal associated with a second serving cell or a machine learning parameter associated with the machine learning model. The set of instructions, when executed by one or more processors of the first network node, may cause the first network node to transmit, to the second network node, assistance information indicating an occurrence of a dynamic network change of a set of specified dynamic network changes, wherein the dynamic network change corresponds to a change from the first network state to the second network state.

Some aspects described herein relate to an apparatus for wireless communication. The apparatus may include means for receiving assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the apparatus, is associated with the first network state, and wherein the plurality of machine learning schemes include at least one of a machine learning model for generating a prediction associated with a first serving cell based at least in part on at least one reference signal associated with a second serving cell or a machine learning parameter associated with the machine learning model. The apparatus may include means for identifying, based at least in part on the assistance information, a second machine learning scheme, from the plurality of machine learning schemes, wherein the second machine learning scheme is associated with the second network state. The apparatus may include means for performing a wireless communication based at least in part on the second machine learning scheme.

Some aspects described herein relate to an apparatus for wireless communication. The apparatus may include means for transmitting, to a network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of a machine learning model for generating a prediction associated with a first serving cell based at least in part on at least one reference signal associated with a second serving cell or a machine learning parameter associated with the machine learning model. The apparatus may include means for transmitting, to the network node, assistance information indicating an occurrence of a dynamic network change of a set of specified dynamic network changes, wherein the dynamic network change corresponds to a change from the first network state to the second network state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
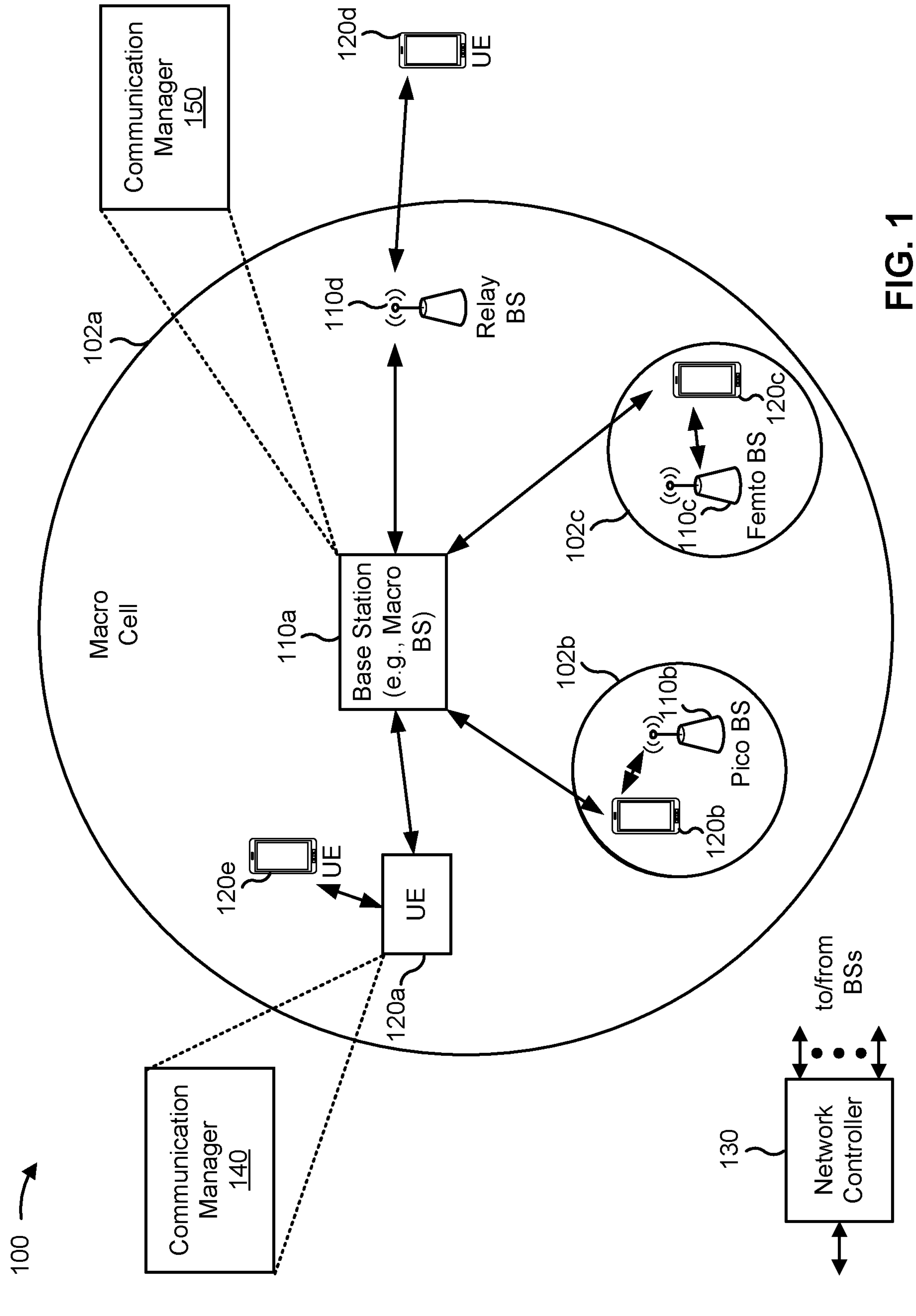
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which also may be referred to as a "node" or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the first network node may include a communication manager 140 or a communication manager 150. As described in more detail elsewhere herein, the communication manager 140 or 150 may receive assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of: a machine learning model for generating a prediction associated with a first serving cell based at least in part on at least one reference signal associated with a second serving cell, or a machine learning parameter associated with the machine learning model; identify, based at least in part on the assistance information, a second machine learning scheme, from the plurality of machine learning schemes, wherein the second machine learning scheme is associated with the second network state; and perform a wireless communication based at least in part on the second machine learning scheme.

In some aspects, the communication manager 140 or 150 may transmit, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of: a machine learning model for generating a prediction associated with a first serving cell based at least in part on at least one reference signal associated with a second serving cell, or a machine learning parameter associated with the machine learning model; and transmit, to the second network node, assistance information indicating an occurrence of a dynamic network change of a set of specified dynamic network changes, wherein the dynamic network change corresponds to a change from the first network state to the second network state. Additionally, or alternatively, the communication manager 140 or 150 may perform one or more other operations described herein.

As indicated above, FIG. 1 is provided as an example. Other examples may differ from what is described with regard to FIG. 1.

Figure 2:
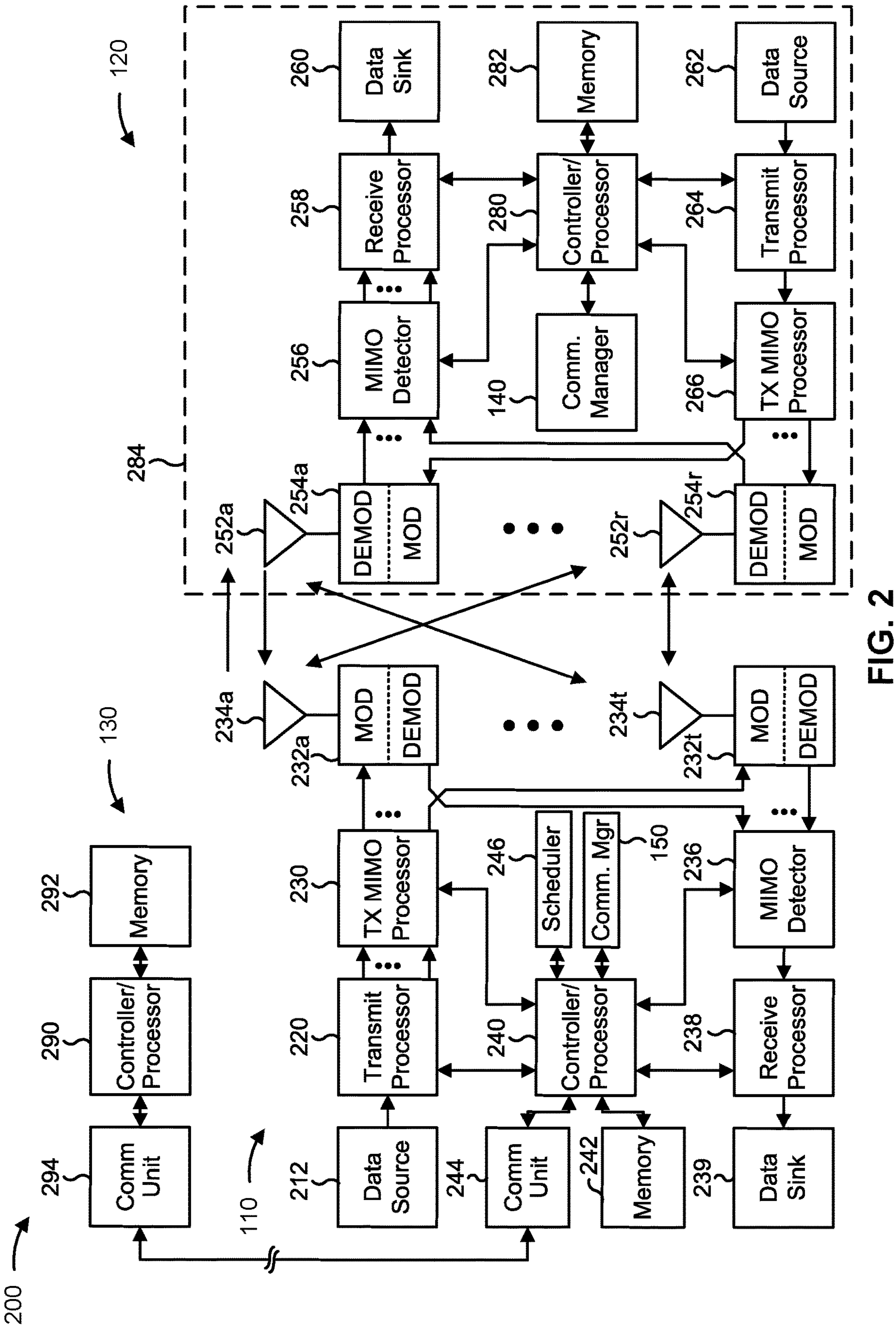
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-7).

The controller/processor 240 of the base station 110, the controller/processor 280 of the UE 120, and/or any other component(s) of FIG. 2 may perform one or more techniques associated with machine learning scheme changing based at least in part on dynamic network changes, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 500 of FIG. 6, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 6, process 600 of FIG. 6, and/or other processes as described herein. In some examples, executing instructions may include running the instructions, converting the instructions, compiling the instructions, and/or interpreting the instructions, among other examples.

In some aspects, a first network node includes means for receiving assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of: a machine learning model for generating a prediction associated with a first serving cell based at least in part on at least one reference signal associated with a second serving cell, or a machine learning parameter associated with the machine learning model; means for identifying, based at least in part on the assistance information, a second machine learning scheme, from the plurality of machine learning schemes, wherein the second machine learning scheme is associated with the second network state; and/or means for performing a wireless communication based at least in part on the second machine learning scheme.

In some aspects, a first network node includes means for transmitting, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of: a machine learning model for generating a prediction associated with a first serving cell based at least in part on at least one reference signal associated with a second serving cell, or a machine learning parameter associated with the machine learning model; and/or means for transmitting, to the second network node, assistance information indicating an occurrence of a dynamic network change of a set of specified dynamic network changes, wherein the dynamic network change corresponds to a change from the first network state to the second network state. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
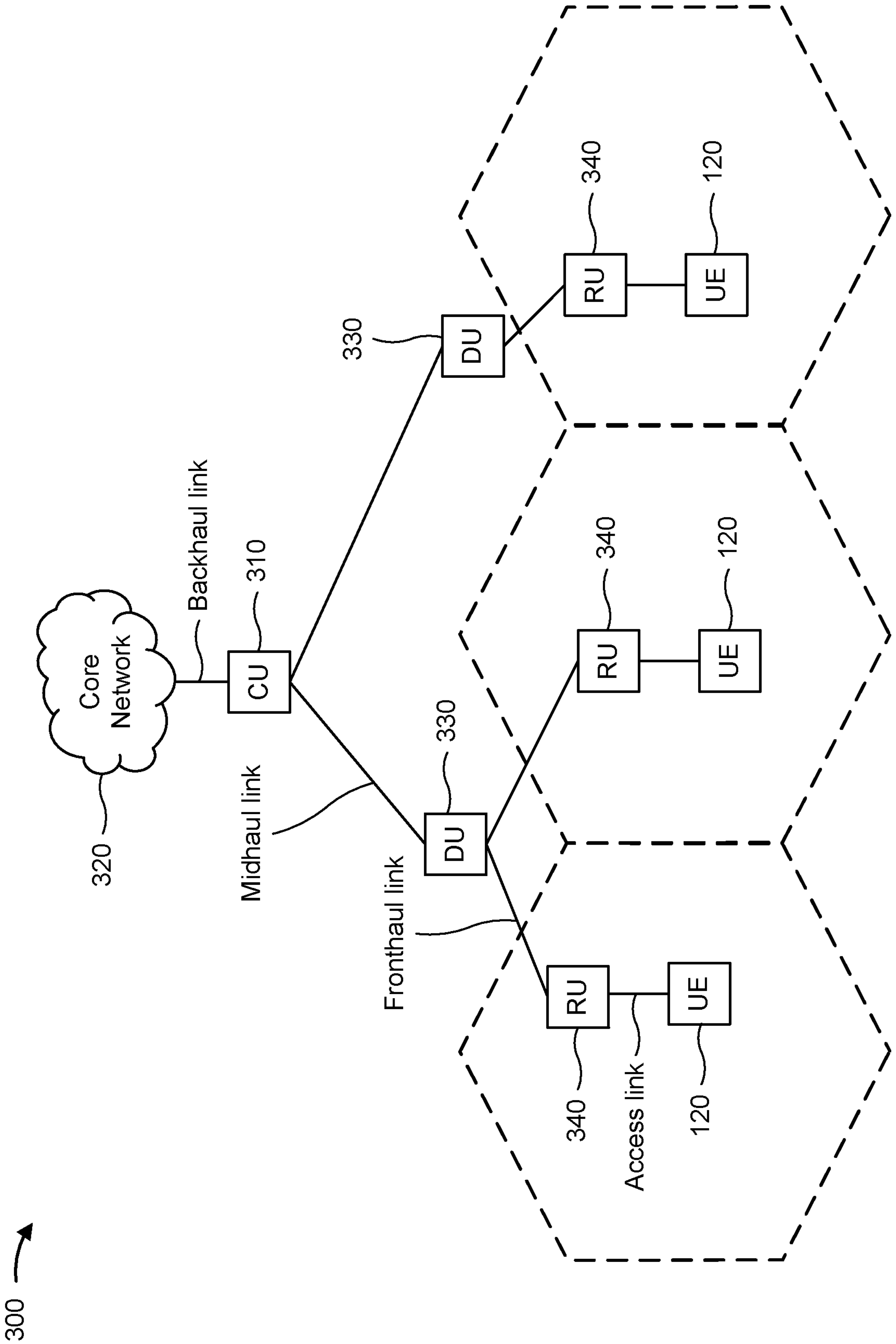
FIG. 3 is a diagram illustrating an example of an open radio access network, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via RF access links. The DUs 330 and the RUs 340 may also be referred to as O-RAN DUS (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

A first network node operating in a wireless network can measure reference signals transmitted by a second network node. For example, the first network node can measure reference signals to determine channel state information (CSI), can measure received power of reference signals from a serving cell and/or neighbor cells, can measure signal strength of inter-radio access technology (e.g., WiFi) networks, and/or can measure reference signals to predict beam failure. Machine learning can be used to facilitate determining parameter values associated with measurements and/or predictions such as predictions of beam failure.

In some cases, machine learning can facilitate using reference signals associated with a first serving cell to model and/or predict conditions or events in a second serving cell. In some cases, the first serving cell and the second serving cell can be associated with different frequency ranges. For example, in some cases, wider beams associated with FR1 can serve multiple network nodes (e.g., UEs) and can be used to facilitate beam failure with respect to beams associated with FR2 with less overhead than using beams from FR2 to predict the beam failures. Using wider beams can also result in fewer scheduling restrictions and less altering of reception beams via phase shifting, thereby resulting in lower power consumption.

In some cases, for example, a machine learning model can be configured to determine CSI and/or predict a beam failure based on one or more reference signal measurements. The machine learning model and/or a set of machine learning model parameters corresponding to the machine learning model can be configured based on a context, which can include, for example, information associated with an operating environment, channel characteristics, and/or a network state. A network state can refer to any set of configurations, parameters, and/or conditions associated with a network and/or a network node associated with the network. For example, a network state can refer to a numerology, a bandwidth, a bandwidth part configuration, a precoder, a reference signal pattern, a reference signal type, a serving cell ID, a CSI-port ID, a CSI-port grouping, a transmission power, an antenna array structure, and/or a type of antenna that is active, among other examples.

In some cases, dynamic network changes can impact the usefulness and/or accuracy of a machine learning model and/or parameters of the machine learning model. A dynamic network change can include a change in a network state from a first network state to a second network state. For example, in some cases, a machine learning model can be configured to determine CSI and/or predict beam failure associated with a first serving cell by taking, as input, one or more reference signal measurements corresponding to at least one reference signal associated with one or more other serving cells. To facilitate accuracy, the machine learning model and/or machine learning model parameters associated therewith can be configured to perform calculations based on an association between a network state of the first serving cell and one or more additional network states of the one or more other serving cells. Thus, a dynamic change in a network state of the one or more other serving cells can result in a loss of correlation between the respective network states of the serving cells.

In some cases, for example, a bandwidth part switch can result in a change of numerology of a CSI-reference signal (CSI-RS) in a second serving cell. In another example, a precoder and/or reference signal pattern can be changed by a network (e.g., based on a UE position change and/or a CSI feedback report, among other examples). In another example, a location of an antenna associated with the second cell can change, thereby changing a relative proximity between the antenna and the network node (e.g., UE). In another example, a central frequency can be changed among component carriers (e.g., serving cells). In another example, a network can remove and/or change reference signals and/or reference signal configurations. Any number of other network state changes can occur in the second serving cell that can cause a lack of association (e.g., correlation and/or established relationship) between the first serving cell and the one or more other serving cells.

As indicated above, a machine learning model configured at a network node (e.g., a UE) can be configured such that the machine learning model and/or one or more machine learning model parameters associated with the machine learning model correspond to the first network state. Accordingly, the dynamic network change from the first network state to the second network state can result in less accurate output from the machine learning model, which can cause unnecessary latency in communication, loss of signal, and/or additional overhead. Thus, dynamic network changes in networks in which network nodes implement machine learning models such as those described herein can produce a negative impact on network node and/or network performance.

Some aspects of the techniques and apparatuses described herein may provide linkages between network states and respective machine learning schemes. A machine learning scheme may include a machine learning model and/or machine learning model parameters associated with the machine learning model. In this way, for example, some aspects may provide for switching from a first machine learning scheme to a second machine learning scheme based on a dynamic network change from a first network state to a second network state. In this way, some aspects may facilitate dynamic adaptation of machine learning model operations based on dynamic network changes, thereby maintaining an association between a first serving cell and a second serving cell (and/or additional serving cells) despite the dynamic network change of the first serving cell. As a result, some aspects may facilitate maintaining at least some degree of accuracy of a machine learning model in a dynamically changing network environment, thereby reducing latency, lost signals, and/or overhead, resulting in a positive impact on network node and/or network performance.

Figure 4:
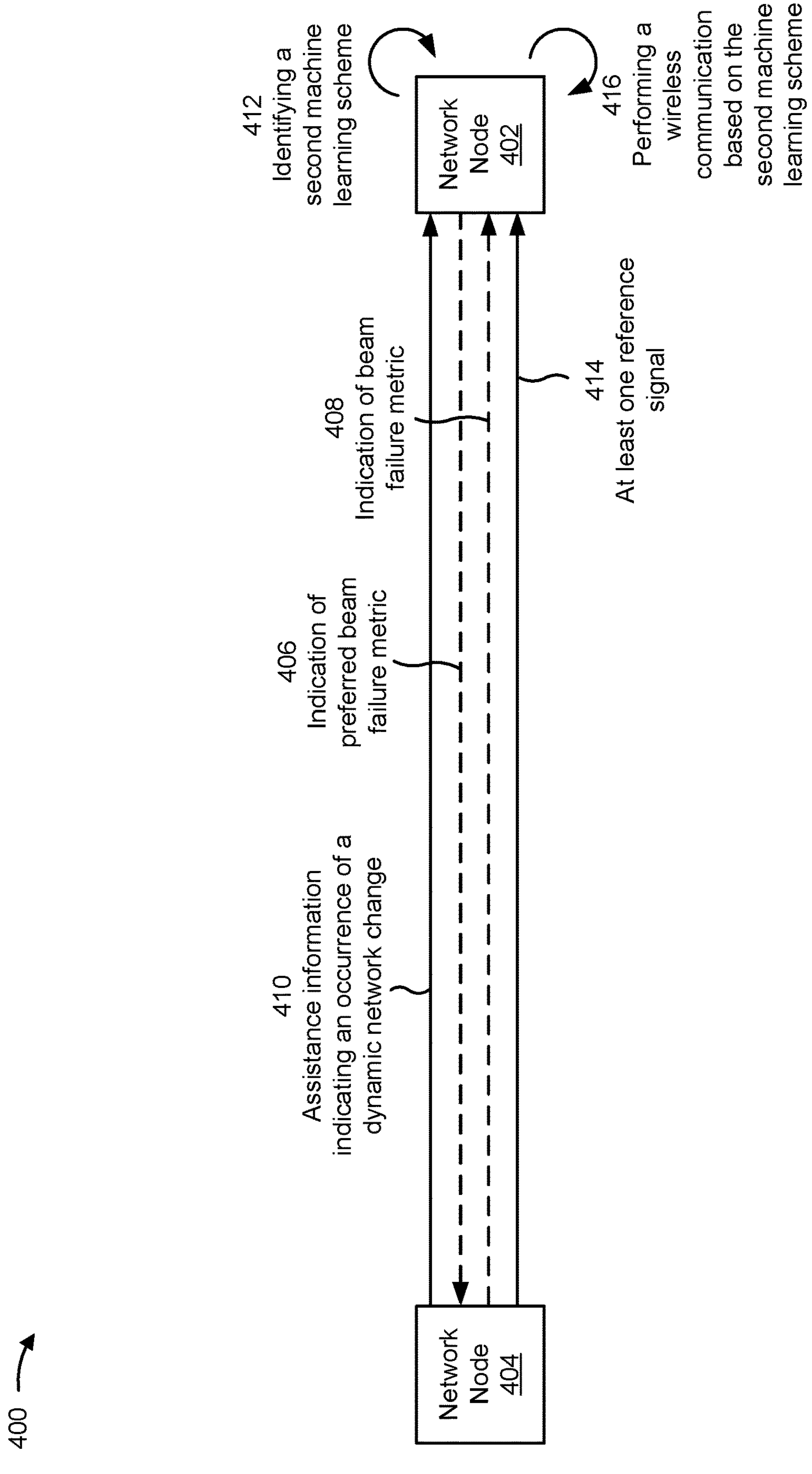
FIG. 4 is a diagram illustrating an example associated with machine learning scheme changing based at least in part on dynamic network changes, in accordance with the present disclosure.

FIG. 4 is a diagram illustrating an example 400 of machine learning scheme changing based at least in part on dynamic network changes, in accordance with the present disclosure. As shown in FIG. 4, a network node 402 and a network node 404 may communicate with one another. In some aspects, the network node 402 may include a UE, and the network node 404 may include a base station, a relay device, another UE, and/or a repeater, among other examples. In some aspects, the network node 404 may provide, or be otherwise associated with, one or more serving cells. For example, the network node 404 may include one or more TRPs, each of which may correspond to a serving cell. In some other aspects, the network node 404 may include one or more base stations and/or relay devices associated with two or more serving cells. Each of the serving cells may be associated with a frequency range. In some aspects, the frequency range of two or more of the serving cells may be different, while in some other aspects, the frequency ranges of two or more serving cells may be the same and/or overlapping.

In some aspects, the network node 402 may be configured with a plurality of machine learning schemes. In some aspects, for example, a first machine learning scheme, of a plurality of machine learning schemes configured at the network node 402, may be associated with a first network state. The plurality of machine learning schemes may include at least one of a machine learning model for generating a prediction associated with a first serving cell based at least in part on at least one reference signal associated with a second serving cell or a machine learning parameter associated with the machine learning model. The machine learning parameter may indicate at least one of a weight associated with at least one of a neuron, a kernel, or a layer, a number of neurons in the machine learning model, a number of kernels in the machine learning model, a number of hidden layers in the machine learning model, a dimension of a layer of the machine learning model, a dimension of an input to the machine learning model, a dimension of an output of the machine learning model, an association between an estimated signal and a machine learning model input feature, an association between a machine learning model output feature and a predicted channel state information, or an association between a machine learning model output feature and a predicted beam failure instance.

For example, in some aspects, the prediction may include a predicted value of at least one channel characteristic associated with the first serving cell. The at least one channel characteristic may include a layer 1 reference signal received power (L1-RSRP), a layer 1 signal to interference plus noise ratio (L1-SINR), a rank indicator (RI), a precoding matrix indicator (PMI), a CQI, and/or a layer indicator (L1), among other examples. In some aspects, the prediction may include a beam failure associated with the first serving cell. The beam failure may be associated with at least one resource corresponding to at least one reference signal associated with the first serving cell. The at least one reference signal may include, for example, at least one of a CSI-RS or a synchronization signal block (SSB). The network node 402 may be configured with linkages connecting the multiple machine learning model parameter sets and/or the multiple machine learning models, with a number of dynamic changes such as those described above.

As shown by reference number 406, the network node 402 may transmit, and the network node 404 may receive, an indication of a preferred beam failure metric. As shown by reference number 408, the network node 404 may transmit, and the network node 402 may receive, an indication of a beam failure metric. In some aspects, the indication of the beam failure metric may be based at least in part on the indication of the preferred beam failure metric. In some aspects, the network node 402 may determine the beam failure metric and may transmit an indication of the beam failure metric to the network node 404. In some aspects, the beam failure metric may indicate at least one of a physical downlink control channel hypothesis block error rate identified based on a beam failure detection reference signal (BFD-RS), an explicit channel identified based at least in part on the BFD-RS, a precoding matrix indicator identified based at least in part on the BFD-RS, or an interference measurement resource associated with the second serving cell. In some aspects, for example, the interference measurement may be used for determining channel characteristics of the first serving cell.

As shown by reference number 410, the network node 404 may transmit, and the network node 402 may receive, assistance information. The assistance information may indicate an occurrence of at least one dynamic network change of a set of dynamic network changes. The at least one dynamic network change may correspond to a change from a first network state to a second network state. For example, the dynamic network change may include at least one of a bandwidth part switch associated with the second serving cell, a precoder pattern change associated with the second serving cell, a reference signal pattern change associated with the second serving cell, a serving cell ID change associated with the second serving cell, or a change of a combination of serving cell IDs associated with the second serving cell. In some aspects, the dynamic network change may include a bandwidth part switch associated with the second serving cell. The bandwidth part switch may include a change from a first bandwidth part being active to a second bandwidth part being active.

As shown by reference number 412, the network node 402 may identify, based at least in part on the assistance information, a second machine learning scheme, from the plurality of machine learning schemes. The second machine learning scheme may be associated with the second network state. As shown by reference number 414, the network node 404 may transmit, and the network node 402 may receive, at least one reference signal associated with the second serving cell. In some aspects, for example, the at least one reference signal associated with the second serving cell may include at least one of a CSI-RS or an SSB. In some aspects, the identification of the second machine learning scheme may be based at least in part on a specified linkage, of a plurality of specified linkages, that associates the dynamic network change with a specified set of machine learning schemes of the plurality of machine learning schemes.

For example, in some aspects, the first machine learning scheme may be associated with a first numerology and the second machine learning scheme may be associated with a second numerology. The second numerology may correspond to the second bandwidth part. In some aspects, the first machine learning scheme may include a first number of kernels corresponding to a convolutional neural network, and the second machine learning scheme may include a second number of kernels corresponding to the convolutional neural network. The first number of kernels may be associated with a first bandwidth, and the second number of kernels may be associated with a second bandwidth. The second bandwidth part may include the second bandwidth.

In some aspects, the dynamic network change may include a precoder pattern change associated with the second serving cell. The precoder pattern change may include a change from a first precoder pattern corresponding to a first TCI state ID to a second precoder pattern corresponding to a second TCI state ID. The TCI state IDs may correspond, for example, to CSI-RS and/or SSB resources associated with the second serving cell. The first machine learning scheme may be associated with the first TCI state ID, and the second machine learning scheme may be associated with the second TCI state ID. In some aspects, the dynamic network change may include the reference signal pattern change associated with the second serving cell. The reference signal pattern change may include a change from a first reference signal pattern to a second reference signal pattern. The first machine learning scheme may be associated with the first reference signal pattern, and the second machine learning scheme may be associated with the second reference signal pattern.

In some aspects, the dynamic network change may include the reference signal pattern change associated with the second serving cell, where the reference signal pattern change includes a change from a first reference signal characteristic of a plurality of reference signal characteristics to a second reference signal characteristic of the plurality of reference signal characteristics. The first machine learning scheme may be associated with the first reference signal characteristic, and the second machine learning scheme may be associated with the second reference signal characteristic. In some aspects, the plurality of reference signal characteristics may include at least one of a CSI-RS type, an indication of a quantity of ports associated with the reference signal, or an SSB type.

In some aspects, the dynamic network change may include the serving cell ID change associated with the second serving cell. The serving cell ID change may include, for example, a change from a first serving cell ID corresponding to a second serving cell ID. The first machine learning scheme may be associated with the first serving cell ID, and the second machine learning scheme may be associated with the second serving cell ID. The serving cell ID change may include a change from a first reference signal ID to a second reference signal ID. The first machine learning scheme may be associated with the first reference signal ID, and the second machine learning scheme may be associated with the second reference signal ID.

In some aspects, the dynamic network change may include the change of a combination of serving cell IDs associated with the second serving cell. The change of the combination of serving cell IDs may include a change from a first combination of serving cell IDs to a second combination of serving cell IDs. The first machine learning scheme may be associated with the first combination of serving cell IDs, and the second machine learning scheme may be associated with the second combination of serving cell IDs. In some aspects, for example, one or more of the serving cells may be reconfigured and/or otherwise dynamically changed via one or more MAC control elements (MAC-CEs) and/or DCI.

In some aspects, the prediction may include a predicted value of at least one channel characteristic associated with the first serving cell, and the dynamic network change may include a change of a first antenna array structure to a second antenna array structure. The first machine learning scheme may be associated with the first antenna array structure, and the second machine learning scheme may be associated with the second antenna array structure. The second antenna array structure may, for example, include at least one of a number of antenna elements along a specified dimension, a distance between a first antenna element and a second antenna element, or a cross-polarization scheme associated with the second antenna array structure. The assistance information may include an indication of a serving cell ID change or an indication of a change of a combination of serving cell IDs.

The dynamic network change may include a change of a CSI-RS port grouping pattern associated with the second serving cell. The change of the CSI-RS port grouping pattern may include a change from a first CSI-RS port grouping pattern to a second CSI-RS port grouping pattern. The first machine learning scheme may be associated with the first CSI-RS port grouping pattern, and the second machine learning scheme may be associated with the second CSI-RS port grouping pattern.

The second CSI-RS port grouping pattern may include an association between an antenna element and a CSI-RS port. In some aspects, the assistance information may indicate the change of the CSI-RS port grouping pattern, and the assistance information may include an indication of a serving cell ID change or an indication of a change of a combination of serving cell IDs. In some aspects, the dynamic network change may include a change from a first connection between a first set of CSI-RS ports associated with the first serving cell with a second set of CSI-RS ports associated with the second serving cell to a second connection between a third set of CSI ports associated with the first serving cell with a fourth set of CSI-RS ports associated with the second serving cell. The first machine learning scheme may be associated with the first connection, and the second machine learning scheme may be associated with the second connection. The assistance information may indicate the change from the first connection to the second connection. For example, the assistance information may include an indication of at least one of a bandwidth part switch associated with the second serving cell, a precoder pattern change associated with the second serving cell, a reference signal pattern change associated with the second serving cell, a serving cell ID change associated with the second serving cell, or a change of a combination of serving cell IDs associated with the second serving cell.

In some aspects, as described above, the machine learning model may be configured to determine a predicted beam failure associated with the first serving cell. In some aspects, the dynamic network change may include a change from a first metric associated with a BFD-RS associated with the first serving cell to a second metric associated with the BFD-RS. The first machine learning scheme may be associated with the first metric, and the second machine learning scheme may be associated with the second metric.

As shown by reference number 416, the network node 402 may perform a wireless communication based at least in part on the second machine learning scheme. For example, the network node 402 may determine CSI and/or predict a beam failure based at least in part on the second machine learning scheme.

As indicated above, FIG. 4 is provided as an example. Other examples may differ from what is described with respect to FIG. 4.

Figure 5:
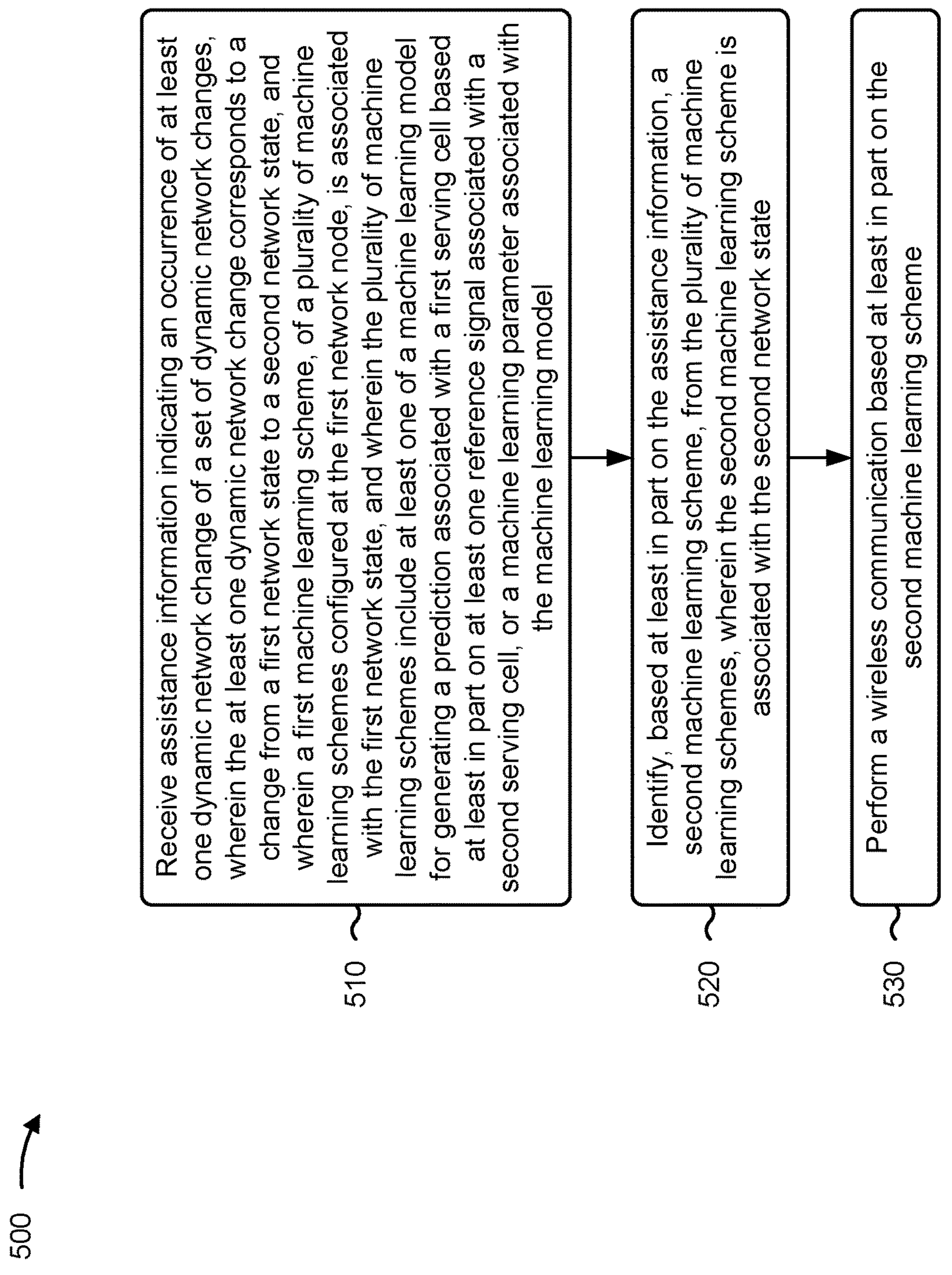
FIGS. 5 and 6 are diagrams illustrating example processes associated with machine learning scheme changing based at least in part on dynamic network changes, in accordance with the present disclosure.

FIG. 5 is a diagram illustrating an example process 500 performed, for example, by a first network node, in accordance with the present disclosure. Example process 500 is an example where the first network node (e.g., network node 402) performs operations associated with techniques for machine learning scheme changing based at least in part on dynamic network changes.

As shown in FIG. 5, in some aspects, process 500 may include receiving assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of: a machine learning model for generating a prediction associated with a first serving cell based at least in part on at least one reference signal associated with a second serving cell, or a machine learning parameter associated with the machine learning model (block 510). For example, the first network node (e.g., using communication manager 708 and/or reception component 702, depicted in FIG. 7) may receive assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of: a machine learning model for generating a prediction associated with a first serving cell based at least in part on at least one reference signal associated with a second serving cell, or a machine learning parameter associated with the machine learning model, as described above.

As further shown in FIG. 5, in some aspects, process 500 may include identifying, based at least in part on the assistance information, a second machine learning scheme, from the plurality of machine learning schemes, wherein the second machine learning scheme is associated with the second network state (block 520). For example, the first network node (e.g., using communication manager 708 and/or identification component 710, depicted in FIG. 7) may identify, based at least in part on the assistance information, a second machine learning scheme, from the plurality of machine learning schemes, wherein the second machine learning scheme is associated with the second network state, as described above.

As further shown in FIG. 5, in some aspects, process 500 may include performing a wireless communication based at least in part on the second machine learning scheme (block 530). For example, the first network node (e.g., using communication manager 708, reception component 702, and/or transmission component 704, depicted in FIG. 7) may perform a wireless communication based at least in part on the second machine learning scheme, as described above.

Process 500 may include additional aspects, such as any single aspect or any combination of aspects described below and/or in connection with one or more other processes described elsewhere herein.

In a first aspect, the prediction comprises at least one of a predicted value of at least one channel characteristic associated with the first serving cell, or a beam failure associated with the first serving cell. In a second aspect, alone or in combination with the first aspect, the at least one channel characteristic comprises at least one of a layer 1 reference signal received power, a layer 1 signal to interference plus noise ratio, a rank indicator, a precoding matrix indicator, a channel quality index, or a layer indicator. In a third aspect, alone or in combination with one or more of the first and second aspects, the beam failure is associated with at least one resource corresponding to at least one reference signal associated with the first serving cell. In a fourth aspect, alone or in combination with the third aspect, the at least one reference signal comprises at least one of a channel state information reference signal or a synchronization signal block.

In a fifth aspect, alone or in combination with one or more of the first through fourth aspects, the at least one reference signal associated with the second serving cell comprises at least one of a channel state information reference signal or a synchronization signal block. In a sixth aspect, alone or in combination with one or more of the first through fifth aspects, the identification of the second machine learning scheme is based at least in part on a specified linkage, of a plurality of specified linkages, that associates the dynamic network change with a specified set of machine learning schemes of the plurality of machine learning schemes, wherein the specified set of machine learning schemes includes the second machine learning scheme.

In a seventh aspect, alone or in combination with the sixth aspect, the dynamic network change comprises at least one of a bandwidth part switch associated with the second serving cell, a precoder pattern change associated with the second serving cell, a reference signal pattern change associated with the second serving cell, a serving cell ID change associated with the second serving cell, or a change of a combination of serving cell IDs associated with the second serving cell. In an eighth aspect, alone or in combination with the seventh aspect, the dynamic network change comprises the bandwidth part switch associated with the second serving cell, the bandwidth part switch comprising a change from a first bandwidth part being active to a second bandwidth part being active.

In a ninth aspect, alone or in combination with the eighth aspect, the first machine learning scheme is associated with a first numerology and the second machine learning scheme is associated with a second numerology, and wherein the second numerology corresponds to the second bandwidth part. In a tenth aspect, alone or in combination with one or more of the eighth or ninth aspects, the first machine learning scheme comprises a first number of kernels corresponding to a convolutional neural network and the second machine learning scheme comprises a second number of kernels corresponding to the convolutional neural network, wherein the first number of kernels is associated with a first bandwidth and the second number of kernels is associated with a second bandwidth, the second bandwidth part comprising the second bandwidth.

In an eleventh aspect, alone or in combination with one or more of the seventh through tenth aspects, the dynamic network change comprises the precoder pattern change associated with the second serving cell, the precoder pattern change comprising a change from a first precoder pattern corresponding to a first TCI state ID to a second precoder pattern corresponding to a second TCI state ID, and wherein the first machine learning scheme is associated with the first TCI state ID and the second machine learning scheme is associated with the second TCI state ID. In a twelfth aspect, alone or in combination with one or more of the seventh through eleventh aspects, the dynamic network change comprises the reference signal pattern change associated with the second serving cell, wherein the reference signal pattern change comprises a change from a first reference signal pattern to a second reference signal pattern, wherein the first machine learning scheme is associated with the first reference signal pattern and the second machine learning scheme is associated with the second reference signal pattern. In a thirteenth aspect, alone or in combination with one or more of the seventh through twelfth aspects, the dynamic network change comprises the reference signal pattern change associated with the second serving cell, wherein the reference signal pattern change comprises a change from a first reference signal characteristic of a plurality of reference signal characteristics to a second reference signal characteristic of the plurality of reference signal characteristics, wherein the first machine learning scheme is associated with the first reference signal characteristic and the second machine learning scheme is associated with the second reference signal characteristic. In a fourteenth aspect, alone or in combination with the thirteenth aspect, the plurality of reference signal characteristics include at least one of a channel state information reference signal type, an indication of a quantity of ports associated with the reference signal, or a synchronization signal block type.

In a fifteenth aspect, alone or in combination with one or more of the seventh through fourteenth aspects, the dynamic network change comprises the serving cell ID change associated with the second serving cell, the serving cell ID change comprising a change from a first serving cell ID corresponding to a second serving cell ID, and wherein the first machine learning scheme is associated with the first serving cell ID and the second machine learning scheme is associated with the second serving cell ID. In a sixteenth aspect, alone or in combination with the fifteenth aspect, the serving cell ID further comprises a change from a first reference signal ID to a second reference signal ID, and wherein the first machine learning scheme is associated with the first reference signal ID and the second machine learning scheme is associated with the second reference signal ID.

In a seventeenth aspect, alone or in combination with one or more of the seventh through sixteenth aspects, the dynamic network change comprises the change of a combination of serving cell IDs associated with the second serving cell, the change of the combination of serving cell IDs comprising a change from a first combination of serving cell IDs to a second combination of serving cell IDs, and wherein the first machine learning scheme is associated with the first combination of serving cell IDs and the second machine learning scheme is associated with the second combination of serving cell IDs. In an eighteenth aspect, alone or in combination with one or more of the seventh through seventeenth aspects, the prediction comprises a predicted value of at least one channel characteristic associated with the first serving cell, wherein the dynamic network change comprises a change of a first antenna array structure to a second antenna array structure, wherein the first machine learning scheme is associated with the first antenna array structure and the second machine learning scheme is associated with the second antenna array structure. In a nineteenth aspect, alone or in combination with the eighteenth aspect, the second antenna array structure comprises at least one of a number of antenna elements along a specified dimension, a distance between a first antenna element and a second antenna element, or a cross-polarization scheme associated with the second antenna array structure. In a twentieth aspect, alone or in combination with one or more of the eighteenth or nineteenth aspects, the assistance information comprises an indication of a serving cell ID change or an indication of a change of a combination of serving cell IDs.

In a twenty-first aspect, alone or in combination with one or more of the first through twentieth aspects, the dynamic network change comprises a change of a CSI-RS port grouping pattern associated with the second serving cell, the change of the CSI-RS port grouping pattern comprising a change from a first CSI-RS port grouping pattern to a second CSI-RS port grouping pattern, and wherein the first machine learning scheme is associated with the first CSI-RS port grouping pattern and the second machine learning scheme is associated with the second CSI-RS port grouping pattern. In a twenty-second aspect, alone or in combination with the twenty-first aspect, the second CSI-RS port grouping pattern comprises an association between an antenna element and a CSI-RS port. In a twenty-third aspect, alone or in combination with one or more of the twenty-first or twenty-second aspects, the assistance information indicates the change of the CSI-RS port grouping pattern, and wherein the assistance information comprises an indication of a serving cell ID change or an indication of a change of a combination of serving cell IDs.

In a twenty-fourth aspect, alone or in combination with one or more of the first through twenty-third aspects, the dynamic network change comprises a change from a first connection between a first set of CSI-RS ports associated with the first serving cell with a second set of CSI-RS ports associated with the second serving cell to a second connection between a third set of CSI ports associated with the first serving cell with a fourth set of CSI-RS ports associated with the second serving cell, and wherein the first machine learning scheme is associated with the first connection and the second machine learning scheme is associated with the second connection. In a twenty-fifth aspect, alone or in combination with the twenty-fourth aspect, the assistance information indicates the change from the first connection to the second connection, and wherein the assistance information comprises an indication of at least one of a bandwidth part switch associated with the second serving cell, a precoder pattern change associated with the second serving cell, a reference signal pattern change associated with the second serving cell, a serving cell ID change associated with the second serving cell, or a change of a combination of serving cell IDs associated with the second serving cell.

In a twenty-sixth aspect, alone or in combination with one or more of the first through twenty-fifth aspects, the prediction comprises a predicted beam failure associated with the first serving cell. In a twenty-seventh aspect, alone or in combination with the twenty-sixth aspect, the dynamic network change comprises a change from a first metric associated with a BFD-RS associated with the first serving cell to a second metric associated with the BFD-RS, and wherein the first machine learning scheme is associated with the first metric and the second machine learning scheme is associated with the second metric.

In a twenty-eighth aspect, alone or in combination with the twenty-seventh aspect, process 500 includes receiving an indication of the second metric. In a twenty-ninth aspect, alone or in combination with the twenty-eighth aspect, process 500 includes transmitting an indication of a preferred metric, wherein receiving the indication of the second metric comprises receiving the indication of the second metric based at least in part on transmission of the indication of the preferred metric. In a thirtieth aspect, alone or in combination with one or more of the twenty-eighth or twenty-ninth aspects, process 500 includes transmitting an indication of the second metric. In a thirty-first aspect, alone or in combination with one or more of the twenty-seventh through thirtieth aspects, the first or the second metric indicates at least one of a physical downlink control channel hypothesis block error rate identified based on the BFD-RS, an explicit channel identified based at least in part on the BFD-RS, a precoding matrix indicator identified based at least in part on the BFD-RS, or an interference measurement resource associated with the second serving cell.

In a thirty-second aspect, alone or in combination with one or more of the first through thirty-first aspects, the machine learning parameter indicates at least one of a weight associated with at least one of a neuron, a kernel, or a layer, a number of neurons in the machine learning model, a number of kernels in the machine learning model, a number of hidden layers in the machine learning model, a dimension of a layer of the machine learning model, a dimension of an input to the machine learning model, a dimension of an output of the machine learning model, an association between an estimated signal and a machine learning model input feature, an association between a machine learning model output feature and a predicted channel state information, or an association between a machine learning model output feature and a predicted beam failure instance. In a thirty-third aspect, alone or in combination with one or more of the first through thirty-second aspects, the first network node comprises a user equipment.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
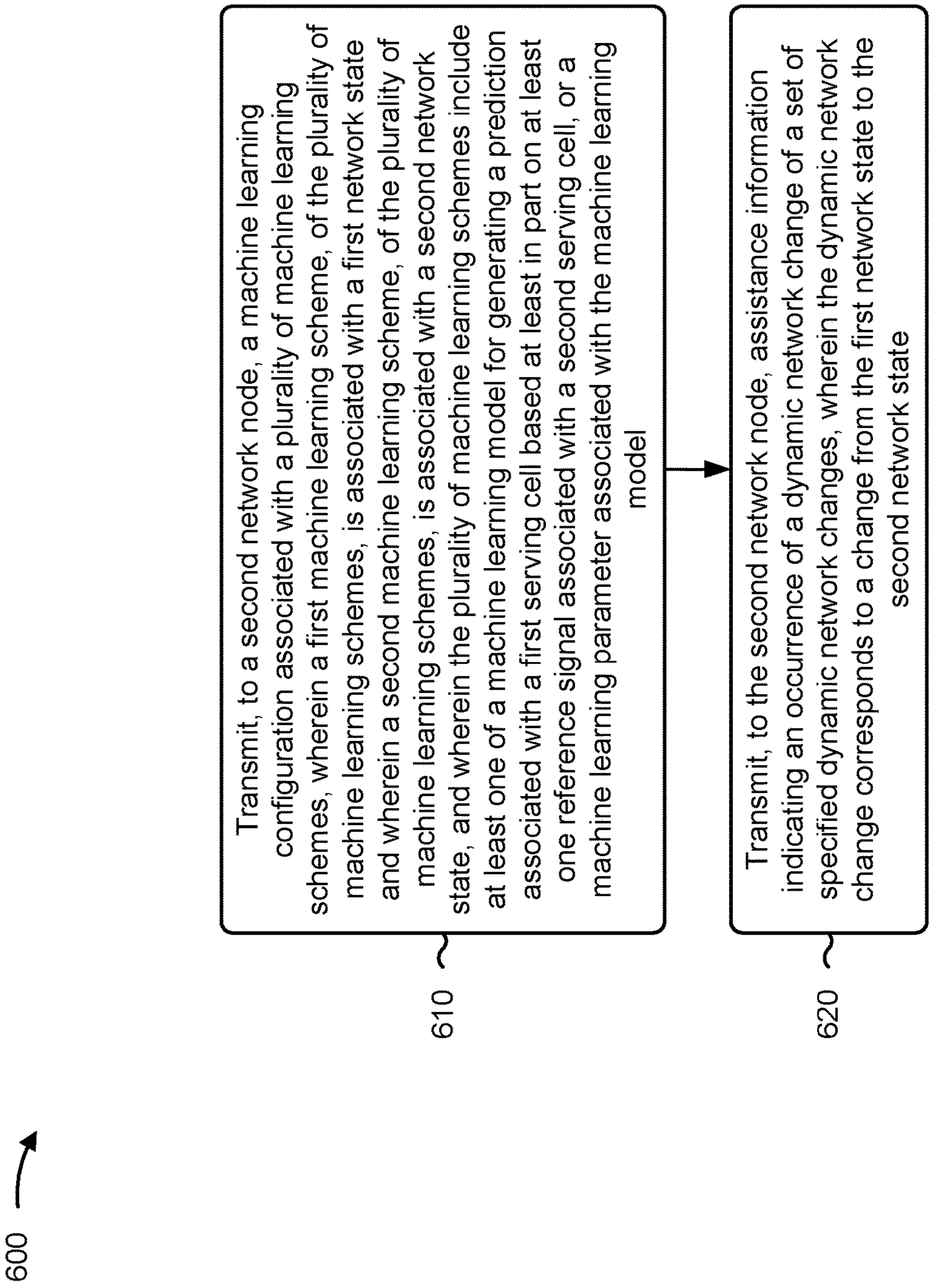

FIG. 6 is a diagram illustrating an example process 600 performed, for example, by a first network node, in accordance with the present disclosure. Example process 600 is an example where the first network node (e.g., network node 404) performs operations associated with techniques for machine learning scheme changing based at least in part on dynamic network changes.

As shown in FIG. 6, in some aspects, process 600 may include transmitting, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of: a machine learning model for generating a prediction associated with a first serving cell based at least in part on at least one reference signal associated with a second serving cell, or a machine learning parameter associated with the machine learning model (block 610). For example, the first network node (e.g., using communication manager 708 and/or transmission component 704, depicted in FIG. 7) may transmit, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of: a machine learning model for generating a prediction associated with a first serving cell based at least in part on at least one reference signal associated with a second serving cell, or a machine learning parameter associated with the machine learning model, as described above.

As further shown in FIG. 6, in some aspects, process 600 may include transmitting, to the second network node, assistance information indicating an occurrence of a dynamic network change of a set of specified dynamic network changes, wherein the dynamic network change corresponds to a change from the first network state to the second network state (block 620). For example, the first network node (e.g., using communication manager 708 and/or transmission component 704, depicted in FIG. 7) may transmit, to the second network node, assistance information indicating an occurrence of a dynamic network change of a set of specified dynamic network changes, wherein the dynamic network change corresponds to a change from the first network state to the second network state, as described above.

Process 600 may include additional aspects, such as any single aspect or any combination of aspects described below and/or in connection with one or more other processes described elsewhere herein.

In a first aspect, the prediction comprises at least one of a predicted value of at least one channel characteristic associated with the first serving cell, or a beam failure associated with the first serving cell. In a second aspect, alone or in combination with the first aspect, the at least one channel characteristic comprises at least one of a layer 1 reference signal received power, a layer 1 signal to interference plus noise ratio, a rank indicator, a precoding matrix indicator, a channel quality index, or a layer indicator. In a third aspect, alone or in combination with one or more of the first and second aspects, the beam failure is associated with at least one resource corresponding to at least one reference signal associated with the first serving cell. In a fourth aspect, alone or in combination with the third aspect, the at least one reference signal comprises at least one of a channel state information reference signal or a synchronization signal block.

In a fifth aspect, alone or in combination with one or more of the first through fourth aspects, the at least one reference signal associated with the second serving cell comprises at least one of a channel state information reference signal or a synchronization signal block. In a sixth aspect, alone or in combination with one or more of the first through fifth aspects, the dynamic network change comprises at least one of a bandwidth part switch associated with the second serving cell, a precoder pattern change associated with the second serving cell, a reference signal pattern change associated with the second serving cell, a serving cell ID change associated with the second serving cell, or a change of a combination of serving cell IDs associated with the second serving cell.

In a seventh aspect, alone or in combination with the sixth aspect, the dynamic network change comprises the bandwidth part switch associated with the second serving cell, the bandwidth part switch comprising a change from a first bandwidth part being active to a second bandwidth part being active. In an eighth aspect, alone or in combination with the seventh aspect, the first machine learning scheme is associated with a first numerology and the second machine learning scheme is associated with a second numerology, and wherein the second numerology corresponds to the second bandwidth part. In a ninth aspect, alone or in combination with one or more of the seventh or eighth aspects, the first machine learning scheme comprises a first number of kernels corresponding to a convolutional neural network and the second machine learning scheme comprises a second number of kernels corresponding to the convolutional neural network, wherein the first number of kernels is associated with a first bandwidth and the second number of kernels is associated with a second bandwidth, the second bandwidth part comprising the second bandwidth.

In a tenth aspect, alone or in combination with one or more of the sixth through ninth aspects, the dynamic network change comprises the precoder pattern change associated with the second serving cell, the precoder pattern change comprising a change from a first precoder pattern corresponding to a first TCI state ID to a second precoder pattern corresponding to a second TCI state ID, and wherein the first machine learning scheme is associated with the first TCI state ID and the second machine learning scheme is associated with the second TCI state ID. In an eleventh aspect, alone or in combination with one or more of the sixth through tenth aspects, the dynamic network change comprises the reference signal pattern change associated with the second serving cell, wherein the reference signal pattern change comprises a change from a first reference signal pattern to a second reference signal pattern, wherein the first machine learning scheme is associated with the first reference signal pattern and the second machine learning scheme is associated with the second reference signal pattern.

In a twelfth aspect, alone or in combination with one or more of the sixth through eleventh aspects, the dynamic network change comprises the reference signal pattern change associated with the second serving cell, wherein the reference signal pattern change comprises a change from a first reference signal characteristic of a plurality of reference signal characteristics to a second reference signal characteristic of the plurality of reference signal characteristics, wherein the first machine learning scheme is associated with the first reference signal characteristic and the second machine learning scheme is associated with the second reference signal characteristic. In a thirteenth aspect, alone or in combination with the twelfth aspect, the plurality of reference signal characteristics include at least one of a channel state information reference signal type, an indication of a quantity of ports associated with the reference signal, or a synchronization signal block type.

In a fourteenth aspect, alone or in combination with one or more of the sixth through thirteenth aspects, the dynamic network change comprises the serving cell ID change associated with the second serving cell, the serving cell ID change comprising a change from a first serving cell ID corresponding to a second serving cell ID, and wherein the first machine learning scheme is associated with the first serving cell ID and the second machine learning scheme is associated with the second serving cell ID. In a fifteenth aspect, alone or in combination with the fourteenth aspect, the serving cell ID further comprises a change from a first reference signal ID to a second reference signal ID, and wherein the first machine learning scheme is associated with the first reference signal ID and the second machine learning scheme is associated with the second reference signal ID. In a sixteenth aspect, alone or in combination with one or more of the sixth through fifteenth aspects, the dynamic network change comprises the change of a combination of serving cell IDs associated with the second serving cell, the change of the combination of serving cell IDs comprising a change from a first combination of serving cell IDs to a second combination of serving cell IDs, and wherein the first machine learning scheme is associated with the first combination of serving cell IDs and the second machine learning scheme is associated with the second combination of serving cell IDs.

In a seventeenth aspect, alone or in combination with one or more of the first through sixteenth aspects, the prediction comprises a predicted value of at least one channel characteristic associated with the first serving cell, wherein the dynamic network change comprises a change of a first antenna array structure to a second antenna array structure, wherein the first machine learning scheme is associated with the first antenna array structure and the second machine learning scheme is associated with the second antenna array structure. In an eighteenth aspect, alone or in combination with the seventeenth aspect, the second antenna array structure comprises at least one of a number of antenna elements along a specified dimension, a distance between a first antenna element and a second antenna element, or a cross-polarization scheme associated with the second antenna array structure.

In a nineteenth aspect, alone or in combination with one or more of the first through eighteenth aspects, the assistance information comprises an indication of a serving cell ID change or an indication of a change of a combination of serving cell IDs. In a twentieth aspect, alone or in combination with one or more of the first through nineteenth aspects, the dynamic network change comprises a change of a CSI-RS port grouping pattern associated with the second serving cell, the change of the CSI-RS port grouping pattern comprising a change from a first CSI-RS port grouping pattern to a second CSI-RS port grouping pattern, and wherein the first machine learning scheme is associated with the first CSI-RS port grouping pattern and the second machine learning scheme is associated with the second CSI-RS port grouping pattern. In a twenty-first aspect, alone or in combination with the twentieth aspect, the second CSI-RS port grouping pattern comprises an association between an antenna element and a CSI-RS port. In a twenty-second aspect, alone or in combination with one or more of the twentieth or twenty-first aspects, the assistance information indicates the change of the CSI-RS port grouping pattern, and wherein the assistance information comprises an indication of a serving cell ID change or an indication of a change of a combination of serving cell IDs.

In a twenty-third aspect, alone or in combination with one or more of the first through twenty-second aspects, the dynamic network change comprises a change from a first connection between a first set of CSI-RS ports associated with the first serving cell with a second set of CSI-RS ports associated with the second serving cell to a second connection between a third set of CSI ports associated with the first serving cell with a fourth set of CSI-RS ports associated with the second serving cell, and wherein the first machine learning scheme is associated with the first connection and the second machine learning scheme is associated with the second connection. In a twenty-fourth aspect, alone or in combination with the twenty-third aspect, the assistance information indicates the change from the first connection to the second connection, and wherein the assistance information comprises an indication of at least one of a bandwidth part switch associated with the second serving cell, a precoder pattern change associated with the second serving cell, a reference signal pattern change associated with the second serving cell, a serving cell ID change associated with the second serving cell, or a change of a combination of serving cell IDs associated with the second serving cell.

In a twenty-fifth aspect, alone or in combination with one or more of the first through twenty-fourth aspects, the prediction comprises a predicted beam failure associated with the first serving cell. In a twenty-sixth aspect, alone or in combination with the twenty-fifth aspect, the dynamic network change comprises a change from a first metric associated with a BFD-RS associated with the first serving cell to a second metric associated with the BFD-RS, and wherein the first machine learning scheme is associated with the first metric and the second machine learning scheme is associated with the second metric. In a twenty-seventh aspect, alone or in combination with the twenty-sixth aspect, process 600 includes transmitting an indication of the second metric. In a twenty-eighth aspect, alone or in combination with the twenty-seventh aspect, process 600 includes receiving an indication of a preferred metric, wherein transmitting the indication of the second metric comprises transmitting the indication of the second metric based at least in part on reception of the indication of the preferred metric. In a twenty-ninth aspect, alone or in combination with one or more of the twenty-seventh or twenty-eighth aspects, process 600 includes receiving an indication of the second metric. In a thirtieth aspect, alone or in combination with one or more of the twenty-sixth through twenty-ninth aspects, the first or the second metric indicates at least one of a physical downlink control channel hypothesis block error rate identified based on the BFD-RS, an explicit channel identified based at least in part on the BFD-RS, a precoding matrix indicator identified based at least in part on the BFD-RS, or an interference measurement resource associated with the second serving cell.

In a thirty-first aspect, alone or in combination with one or more of the first through thirtieth aspects, the machine learning parameter indicates at least one of a weight associated with at least one of a neuron, a kernel, or a layer, a number of neurons in the machine learning model, a number of kernels in the machine learning model, a number of hidden layers in the machine learning model, a dimension of a layer of the machine learning model, a dimension of an input to the machine learning model, a dimension of an output of the machine learning model, an association between an estimated signal and a machine learning model input feature, an association between a machine learning model output feature and a predicted channel state information, or an association between a machine learning model output feature and a predicted beam failure instance. In a thirty-second aspect, alone or in combination with one or more of the first through thirty-first aspects, the first network node comprises a user equipment.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
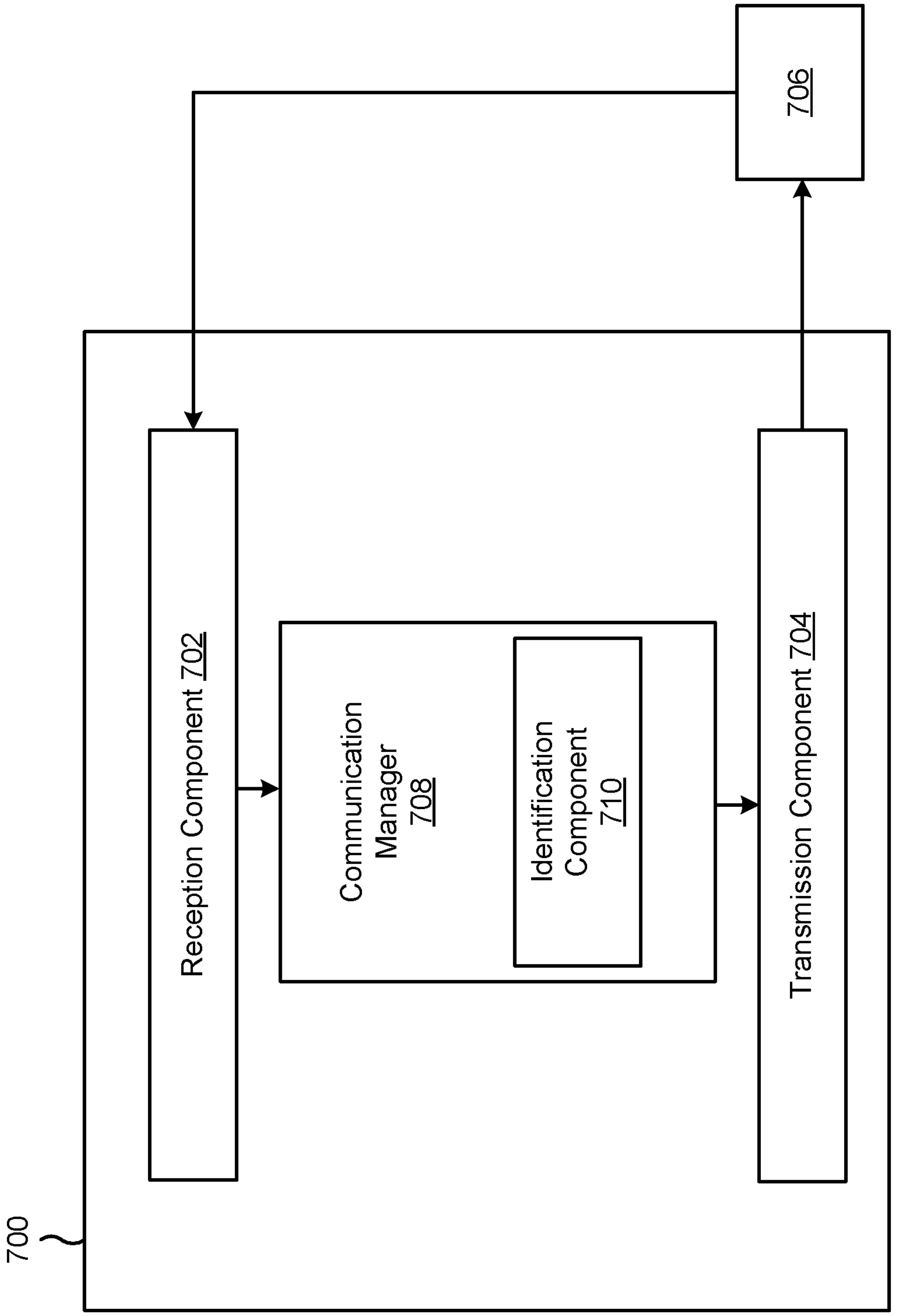
FIG. 7 is a diagram of an example apparatus for wireless communication, in accordance with the present disclosure.

FIG. 7 is a diagram of an example apparatus 700 for wireless communication. The apparatus 700 may be a network node, or a network node may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 708. The communication manager 708 may include an identification component 710.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the network node described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the network node described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the network node described in connection with FIG. 2. In some aspects, the transmission component 704 may be co-located with the reception component 702 in a transceiver.

The reception component 702 may receive assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of a machine learning model for generating a prediction associated with a first serving cell based at least in part on at least one reference signal associated with a second serving cell, or a machine learning parameter associated with the machine learning model.

The communication manager 708 and/or the identification component 710 may identify, based at least in part on the assistance information, a second machine learning scheme, from the plurality of machine learning schemes, wherein the second machine learning scheme is associated with the second network state. In some aspects, the communication manager 708 may include one or more antennas, a modem, a modulator, a controller/processor, a memory, or a combination thereof, of the UE and/or base station described in connection with FIG. 2. In some aspects, the communication manager 708 may include the reception component 702 and/or the transmission component 704. In some aspects, the identification component 710 may include one or more antennas, a modem, a modulator, a controller/processor, a memory, or a combination thereof, of the UE and/or base station described in connection with FIG. 2. In some aspects, the identification component 710 may include the reception component 702 and/or the transmission component 704.

The communication manager 708, reception component 702, and/or transmission component 704 may perform a wireless communication based at least in part on the second machine learning scheme. The reception component 702 may receive an indication of the second metric. The transmission component 704 may transmit an indication of a preferred metric, wherein receiving the indication of the second metric comprises receiving the indication of the second metric based at least in part on transmission of the indication of the preferred metric. The transmission component 704 may transmit an indication of the second metric.

The transmission component 704 may transmit, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of a machine learning model for generating a prediction associated with a first serving cell based at least in part on at least one reference signal associated with a second serving cell, or a machine learning parameter associated with the machine learning model. The transmission component 704 may transmit, to the second network node, assistance information indicating an occurrence of a dynamic network change of a set of specified dynamic network changes, wherein the dynamic network change corresponds to a change from the first network state to the second network state.

The transmission component 704 may transmit an indication of the second metric. The reception component 702 may receive an indication of a preferred metric, wherein transmitting the indication of the second metric comprises transmitting the indication of the second metric based at least in part on reception of the indication of the preferred metric. The reception component 702 may receive an indication of the second metric.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a first network node, comprising: receiving assistance information indicating an occurrence of at least one dynamic network change of a set of dynamic network changes, wherein the at least one dynamic network change corresponds to a change from a first network state to a second network state, and wherein a first machine learning scheme, of a plurality of machine learning schemes configured at the first network node, is associated with the first network state, and wherein the plurality of machine learning schemes include at least one of: a machine learning model for generating a prediction associated with a first serving cell based at least in part on at least one reference signal associated with a second serving cell, or a machine learning parameter associated with the machine learning model; identifying, based at least in part on the assistance information, a second machine learning scheme, from the plurality of machine learning schemes, wherein the second machine learning scheme is associated with the second network state; and performing a wireless communication based at least in part on the second machine learning scheme.

Aspect 2: The method of Aspect 1, wherein the prediction comprises at least one of: a predicted value of at least one channel characteristic associated with the first serving cell, or a beam failure associated with the first serving cell.

Aspect 3: The method of Aspect 2, wherein the at least one channel characteristic comprises at least one of: a layer 1 reference signal received power, a layer 1 signal to interference plus noise ratio, a rank indicator, a precoding matrix indicator, a channel quality index, or a layer indicator.

Aspect 4: The method of either of Aspects 2 or 3, wherein the beam failure is associated with at least one resource corresponding to at least one reference signal associated with the first serving cell.

Aspect 5: The method of Aspect 4, wherein the at least one reference signal comprises at least one of a channel state information reference signal or a synchronization signal block.

Aspect 6: The method of any of Aspects 1-5, wherein the at least one reference signal associated with the second serving cell comprises at least one of a channel state information reference signal or a synchronization signal block.

Aspect 7: The method of any of Aspects 1-5, wherein the identification of the second machine learning scheme is based at least in part on a specified linkage, of a plurality of specified linkages, that associates the dynamic network change with a specified set of machine learning schemes of the plurality of machine learning schemes, wherein the specified set of machine learning schemes includes the second machine learning scheme.

Aspect 8: The method of Aspect 7, wherein the dynamic network change comprises at least one of: a bandwidth part switch associated with the second serving cell, a precoder pattern change associated with the second serving cell, a reference signal pattern change associated with the second serving cell, a serving cell identifier (ID) change associated with the second serving cell, or a change of a combination of serving cell IDs associated with the second serving cell.

Aspect 9: The method of Aspect 8, wherein the dynamic network change comprises the bandwidth part switch associated with the second serving cell, the bandwidth part switch comprising a change from a first bandwidth part being active to a second bandwidth part being active.

Aspect 10: The method of Aspect 9, wherein the first machine learning scheme is associated with a first numerology and the second machine learning scheme is associated with a second numerology, and wherein the second numerology corresponds to the second bandwidth part.

Aspect 11: The method of either of Aspects 9 or 10, wherein the first machine learning scheme comprises a first number of kernels corresponding to a convolutional neural network and the second machine learning scheme comprises a second number of kernels corresponding to the convolutional neural network, wherein the first number of kernels is associated with a first bandwidth and the second number of kernels is associated with a second bandwidth, the second bandwidth part comprising the second bandwidth.

Aspect 12: The method of any of Aspects 8-11, wherein the dynamic network change comprises the precoder pattern change associated with the second serving cell, the precoder pattern change comprising a change from a first precoder pattern corresponding to a first transmission configuration indicator (TCI) state ID to a second precoder pattern corresponding to a second TCI state ID, and wherein the first machine learning scheme is associated with the first TCI state ID and the second machine learning scheme is associated with the second TCI state ID.

Aspect 13: The method of any of Aspects 8-12, wherein the dynamic network change comprises the reference signal pattern change associated with the second serving cell, wherein the reference signal pattern change comprises a change from a first reference signal pattern to a second reference signal pattern, wherein the first machine learning scheme is associated with the first reference signal pattern and the second machine learning scheme is associated with the second reference signal pattern.

Aspect 14: The method of any of Aspects 8-13, wherein the dynamic network change comprises the reference signal pattern change associated with the second serving cell, wherein the reference signal pattern change comprises a change from a first reference signal characteristic of a plurality of reference signal characteristics to a second reference signal characteristic of the plurality of reference signal characteristics, wherein the first machine learning scheme is associated with the first reference signal characteristic and the second machine learning scheme is associated with the second reference signal characteristic.

Aspect 15: The method of Aspect 14, wherein the plurality of reference signal characteristics include at least one of a channel state information reference signal type, an indication of a quantity of ports associated with the reference signal, or a synchronization signal block type.

Aspect 16: The method of any of Aspects 8-15, wherein the dynamic network change comprises the serving cell ID change associated with the second serving cell, the serving cell ID change comprising a change from a first serving cell ID corresponding to a second serving cell ID, and wherein the first machine learning scheme is associated with the first serving cell ID and the second machine learning scheme is associated with the second serving cell ID.

Aspect 17: The method of Aspect 16, wherein the serving cell ID further comprises a change from a first reference signal ID to a second reference signal ID, and wherein the first machine learning scheme is associated with the first reference signal ID and the second machine learning scheme is associated with the second reference signal ID.

Aspect 18: The method of any of Aspects 8-17, wherein the dynamic network change comprises the change of a combination of serving cell IDs associated with the second serving cell, the change of the combination of serving cell IDs comprising a change from a first combination of serving cell IDs to a second combination of serving cell IDs, and wherein the first machine learning scheme is associated with the first combination of serving cell IDs and the second machine learning scheme is associated with the second combination of serving cell IDs.

Aspect 19: The method of any of Aspects 8-18, wherein the prediction comprises a predicted value of at least one channel characteristic associated with the first serving cell, wherein the dynamic network change comprises a change of a first antenna array structure to a second antenna array structure, wherein the first machine learning scheme is associated with the first antenna array structure and the second machine learning scheme is associated with the second antenna array structure.

Aspect 20: The method of Aspect 19, wherein the second antenna array structure comprises at least one of: a number of antenna elements along a specified dimension, a distance between a first antenna element and a second antenna element, or a cross-polarization scheme associated with the second antenna array structure.

Aspect 21: The method of either of Aspects 19 or 20, wherein the assistance information comprises an indication of a serving cell ID change or an indication of a change of a combination of serving cell IDs.

Aspect 22: The method of any of Aspects 1-21, wherein the dynamic network change comprises a change of a channel state information-reference signal (CSI-RS) port grouping pattern associated with the second serving cell, the change of the CSI-RS port grouping pattern comprising a change from a first CSI-RS port grouping pattern to a second CSI-RS port grouping pattern, and wherein the first machine learning scheme is associated with the first CSI-RS port grouping pattern and the second machine learning scheme is associated with the second CSI-RS port grouping pattern.

Aspect 23: The method of Aspect 22, wherein the second CSI-RS port grouping pattern comprises an association between an antenna element and a CSI-RS port.

Aspect 24: The method of either of Aspects 22 or 23, wherein the assistance information indicates the change of the CSI-RS port grouping pattern, and wherein the assistance information comprises an indication of a serving cell ID change or an indication of a change of a combination of serving cell IDs.

Aspect 25: The method of any of Aspects 1-24, wherein the dynamic network change comprises a change from a first connection between a first set of channel state information-reference signal (CSI-RS) ports associated with the first serving cell with a second set of CSI-RS ports associated with the second serving cell to a second connection between a third set of CSI ports associated with the first serving cell with a fourth set of CSI-RS ports associated with the second serving cell, and wherein the first machine learning scheme is associated with the first connection and the second machine learning scheme is associated with the second connection.

Aspect 26: The method of Aspect 25, wherein the assistance information indicates the change from the first connection to the second connection, and wherein the assistance information comprises an indication of at least one of: a bandwidth part switch associated with the second serving cell, a precoder pattern change associated with the second serving cell, a reference signal pattern change associated with the second serving cell, a serving cell identifier (ID)

change associated with the second serving cell, or a change of a combination of serving cell IDs associated with the second serving cell.

Aspect 27: The method of any of Aspects 1-26, wherein the prediction comprises a predicted beam failure associated with the first serving cell.

Aspect 28: The method of Aspect 27, wherein the dynamic network change comprises a change from a first metric associated with a beam failure detection reference signal (BFD-RS) associated with the first serving cell to a second metric associated with the BFD-RS, and wherein the first machine learning scheme is associated with the first metric and the second machine learning scheme is associated with the second metric.

Aspect 29: The method of Aspect 28, further comprising receiving an indication of the second metric.

Aspect 30: The method of Aspect 29, further comprising transmitting an indication of a preferred metric, wherein receiving the indication of the second metric comprises receiving the indication of the second metric based at least in part on transmission of the indication of the preferred metric.

Aspect 31: The method of either of Aspects 29 or 30, further comprising transmitting an indication of the second metric.

Aspect 32: The method of any of Aspects 28-31, wherein the first or the second metric indicates at least one of: a physical downlink control channel hypothesis block error rate identified based on the BFD-RS, an explicit channel identified based at least in part on the BFD-RS, a precoding matrix indicator identified based at least in part on the BFD-RS, or an interference measurement resource associated with the second serving cell.

Aspect 33: The method of any of Aspects 1-32, wherein the machine learning parameter indicates at least one of: a weight associated with at least one of a neuron, a kernel, or a layer, a number of neurons in the machine learning model, a number of kernels in the machine learning model, a number of hidden layers in the machine learning model, a dimension of a layer of the machine learning model, a dimension of an input to the machine learning model, a dimension of an output of the machine learning model, an association between an estimated signal and a machine learning model input feature, an association between a machine learning model output feature and a predicted channel state information, or an association between a machine learning model output feature and a predicted beam failure instance.

Aspect 34: The method of any of Aspects 1-33, wherein the first network node comprises a user equipment.

Aspect 35: A method of wireless communication performed by a first network node, comprising: transmitting, to a second network node, a machine learning configuration associated with a plurality of machine learning schemes, wherein a first machine learning scheme, of the plurality of machine learning schemes, is associated with a first network state and wherein a second machine learning scheme, of the plurality of machine learning schemes, is associated with a second network state, and wherein the plurality of machine learning schemes include at least one of: a machine learning model for generating a prediction associated with a first serving cell based at least in part on at least one reference signal associated with a second serving cell, or a machine learning parameter associated with the machine learning model; and transmitting, to the second network node, assistance information indicating an occurrence of a dynamic network change of a set of specified dynamic network changes, wherein the dynamic network change corresponds to a change from the first network state to the second network state.

Aspect 36: The method of Aspect 35, wherein the prediction comprises at least one of: a predicted value of at least one channel characteristic associated with the first serving cell, or a beam failure associated with the first serving cell.

Aspect 37: The method of Aspect 36, wherein the at least one channel characteristic comprises at least one of: a layer 1 reference signal received power, a layer 1 signal to interference plus noise ratio, a rank indicator, a precoding matrix indicator, a channel quality index, or a layer indicator.

Aspect 38: The method of either of Aspects 36 or 37, wherein the beam failure is associated with at least one resource corresponding to at least one reference signal associated with the first serving cell.

Aspect 39: The method of Aspect 38, wherein the at least one reference signal comprises at least one of a channel state information reference signal or a synchronization signal block.

Aspect 40: The method of any of Aspects 35-39, wherein the at least one reference signal associated with the second serving cell comprises at least one of a channel state information reference signal or a synchronization signal block.

Aspect 41: The method of any of Aspects 35-40, wherein the dynamic network change comprises at least one of: a bandwidth part switch associated with the second serving cell, a precoder pattern change associated with the second serving cell, a reference signal pattern change associated with the second serving cell, a serving cell identifier (ID) change associated with the second serving cell, or a change of a combination of serving cell IDs associated with the second serving cell.

Aspect 42: The method of Aspect 41, wherein the dynamic network change comprises the bandwidth part switch associated with the second serving cell, the bandwidth part switch comprising a change from a first bandwidth part being active to a second bandwidth part being active.

Aspect 43: The method of Aspect 42, wherein the first machine learning scheme is associated with a first numerology and the second machine learning scheme is associated with a second numerology, and wherein the second numerology corresponds to the second bandwidth part.

Aspect 44: The method of either of Aspects 42 or 43, wherein the first machine learning scheme comprises a first number of kernels corresponding to a convolutional neural network and the second machine learning scheme comprises a second number of kernels corresponding to the convolutional neural network, wherein the first number of kernels is associated with a first bandwidth and the second number of kernels is associated with a second bandwidth, the second bandwidth part comprising the second bandwidth.

Aspect 45: The method of any of Aspects 41-44, wherein the dynamic network change comprises the precoder pattern change associated with the second serving cell, the precoder pattern change comprising a change from a first precoder pattern corresponding to a first transmission configuration indicator (TCI) state ID to a second precoder pattern corresponding to a second TCI state ID, and wherein the first machine learning scheme is associated with the first TCI state ID and the second machine learning scheme is associated with the second TCI state ID.

Aspect 46: The method of any of Aspects 41-45, wherein the dynamic network change comprises the reference signal pattern change associated with the second serving cell, wherein the reference signal pattern change comprises a change from a first reference signal pattern to a second reference signal pattern, wherein the first machine learning scheme is associated with the first reference signal pattern and the second machine learning scheme is associated with the second reference signal pattern.

Aspect 47: The method of any of Aspects 41-46, wherein the dynamic network change comprises the reference signal pattern change associated with the second serving cell, wherein the reference signal pattern change comprises a change from a first reference signal characteristic of a plurality of reference signal characteristics to a second reference signal characteristic of the plurality of reference signal characteristics, wherein the first machine learning scheme is associated with the first reference signal characteristic and the second machine learning scheme is associated with the second reference signal characteristic.

Aspect 48: The method of Aspect 47, wherein the plurality of reference signal characteristics include at least one of a channel state information reference signal type, an indication of a quantity of ports associated with the reference signal, or a synchronization signal block type.

Aspect 49: The method of any of Aspects 41-48, wherein the dynamic network change comprises the serving cell ID change associated with the second serving cell, the serving cell ID change comprising a change from a first serving cell ID corresponding to a second serving cell ID, and wherein the first machine learning scheme is associated with the first serving cell ID and the second machine learning scheme is associated with the second serving cell ID.

Aspect 50: The method of Aspect 49, wherein the serving cell ID further comprises a change from a first reference signal ID to a second reference signal ID, and wherein the first machine learning scheme is associated with the first reference signal ID and the second machine learning scheme is associated with the second reference signal ID.

Aspect 51: The method of any of Aspects 41-50, wherein the dynamic network change comprises the change of a combination of serving cell IDs associated with the second serving cell, the change of the combination of serving cell IDs comprising a change from a first combination of serving cell IDs to a second combination of serving cell IDs, and wherein the first machine learning scheme is associated with the first combination of serving cell IDs and the second machine learning scheme is associated with the second combination of serving cell IDs.

Aspect 52: The method of any of Aspects 35-51, wherein the prediction comprises a predicted value of at least one channel characteristic associated with the first serving cell, wherein the dynamic network change comprises a change of a first antenna array structure to a second antenna array structure, wherein the first machine learning scheme is associated with the first antenna array structure and the second machine learning scheme is associated with the second antenna array structure.

Aspect 53: The method of Aspect 52, wherein the second antenna array structure comprises at least one of: a number of antenna elements along a specified dimension, a distance between a first antenna element and a second antenna element, or a cross-polarization scheme associated with the second antenna array structure.

Aspect 54: The method of any of Aspects 35-53, wherein the assistance information comprises an indication of a serving cell identifier (ID) change or an indication of a change of a combination of serving cell IDs.

Aspect 55: The method of any of Aspects 35-54, wherein the dynamic network change comprises a change of a channel state information-reference signal (CSI-RS) port grouping pattern associated with the second serving cell, the change of the CSI-RS port grouping pattern comprising a change from a first CSI-RS port grouping pattern to a second CSI-RS port grouping pattern, and wherein the first machine learning scheme is associated with the first CSI-RS port grouping pattern and the second machine learning scheme is associated with the second CSI-RS port grouping pattern.

Aspect 56: The method of Aspect 55, wherein the second CSI-RS port grouping pattern comprises an association between an antenna element and a CSI-RS port.

Aspect 57: The method of either of Aspects 55 or 56, wherein the assistance information indicates the change of the CSI-RS port grouping pattern, and wherein the assistance information comprises an indication of a serving cell ID change or an indication of a change of a combination of serving cell IDs.

Aspect 58: The method of any of Aspects 35-57, wherein the dynamic network change comprises a change from a first connection between a first set of channel state information-reference signal (CSI-RS) ports associated with the first serving cell with a second set of CSI-RS ports associated with the second serving cell to a second connection between a third set of CSI ports associated with the first serving cell with a fourth set of CSI-RS ports associated with the second serving cell, and wherein the first machine learning scheme is associated with the first connection and the second machine learning scheme is associated with the second connection.

Aspect 59: The method of Aspect 58, wherein the assistance information indicates the change from the first connection to the second connection, and wherein the assistance information comprises an indication of at least one of: a bandwidth part switch associated with the second serving cell, a precoder pattern change associated with the second serving cell, a reference signal pattern change associated with the second serving cell, a serving cell identifier (ID) change associated with the second serving cell, or a change of a combination of serving cell IDs associated with the second serving cell.

Aspect 60: The method of any of Aspects 35-59, wherein the prediction comprises a predicted beam failure associated with the first serving cell.

Aspect 61: The method of Aspect 60, wherein the dynamic network change comprises a change from a first metric associated with a beam failure detection reference signal (BFD-RS) associated with the first serving cell to a second metric associated with the BFD-RS, and wherein the first machine learning scheme is associated with the first metric and the second machine learning scheme is associated with the second metric.

Aspect 62: The method of Aspect 61, further comprising transmitting an indication of the second metric.

Aspect 63: The method of Aspect 62, further comprising receiving an indication of a preferred metric, wherein transmitting the indication of the second metric comprises transmitting the indication of the second metric based at least in part on reception of the indication of the preferred metric.

Aspect 64: The method of either of Aspects 62 or 63, further comprising receiving an indication of the second metric.

Aspect 65: The method of any of Aspects 61-64, wherein the first or the second metric indicates at least one of: a physical downlink control channel hypothesis block error rate identified based on the BFD-RS, an explicit channel identified based at least in part on the BFD-RS, a precoding matrix indicator identified based at least in part on the BFD-RS, or an interference measurement resource associated with the second serving cell.

Aspect 66: The method of any of Aspects 35-65, wherein the machine learning parameter indicates at least one of: a weight associated with at least one of a neuron, a kernel, or a layer, a number of neurons in the machine learning model, a number of kernels in the machine learning model, a number of hidden layers in the machine learning model, a dimension of a layer of the machine learning model, a dimension of an input to the machine learning model, a dimension of an output of the machine learning model, an association between an estimated signal and a machine learning model input feature, an association between a machine learning model output feature and a predicted channel state information, or an association between a machine learning model output feature and a predicted beam failure instance.

Aspect 67: The method of any of Aspects 35-66, wherein the first network node comprises a user equipment.

Aspect 68: An apparatus for wireless communication at a device, comprising a processor; memory coupled with the processor; and instructions stored in the memory and executable by the processor to cause the apparatus to perform the method of one or more of Aspects 1-34.

Aspect 69: A device for wireless communication, comprising a memory and one or more processors coupled to the memory, the one or more processors configured to perform the method of one or more of Aspects 1-34.

Aspect 70: An apparatus for wireless communication, comprising at least one means for performing the method of one or more of Aspects 1-34.

Aspect 71: A non-transitory computer-readable medium storing code for wireless communication, the code comprising instructions executable by a processor to perform the method of one or more of Aspects 1-34.

Aspect 72: A non-transitory computer-readable medium storing a set of instructions for wireless communication, the set of instructions comprising one or more instructions that, when executed by one or more processors of a device, cause the device to perform the method of one or more of Aspects 1-34.

Aspect 73: An apparatus for wireless communication at a device, comprising a processor; memory coupled with the processor; and instructions stored in the memory and executable by the processor to cause the apparatus to perform the method of one or more of Aspects 35-67.

Aspect 74: A device for wireless communication, comprising a memory and one or more processors coupled to the memory, the one or more processors configured to perform the method of one or more of Aspects 35-67.

Aspect 75: An apparatus for wireless communication, comprising at least one means for performing the method of one or more of Aspects 35-67.

Aspect 76: A non-transitory computer-readable medium storing code for wireless communication, the code comprising instructions executable by a processor to perform the method of one or more of Aspects 35-67.

Aspect 77: A non-transitory computer-readable medium storing a set of instructions for wireless communication, the set of instructions comprising one or more instructions that, when executed by one or more processors of a device, cause the device to perform the method of one or more of Aspects 35-67.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” or the like are intended to be open-ended terms that do not limit an element that they modify (e.g., an element “having” A may also have B). Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A first network node for wireless communication, comprising:

one or more antennas; and a processing system that includes one or more processors and one or more memories that store code and are coupled with the one or more processors, the processing system configured to cause the first network node to:

receive assistance information indicating an occurrence of at least one dynamic network change of a set of dynamic network changes, wherein the at least one dynamic network change corresponds to a change from a first network state to a second network state, wherein a first machine learning scheme, of a plurality of machine learning schemes configured at the first network node, is associated with the first network state and a first numerology, wherein the plurality of machine learning schemes include a machine learning model for generating a prediction associated with a first serving cell based at least in part on at least one reference signal associated with a second serving cell, wherein the at least one dynamic network change comprises a bandwidth part switch associated with the second serving cell, and wherein the bandwidth part switch comprises a change from a first bandwidth part being active to a second bandwidth part being active;

identify, based at least in part on the assistance information, a second machine learning scheme, from the plurality of machine learning schemes, wherein the second machine learning scheme is associated with the second network state and a second numerology, and wherein the second numerology corresponds to the second bandwidth part; and perform a wireless communication based at least in part on the second machine learning scheme.

2. The first network node of claim 1, wherein the prediction comprises at least one of:

a predicted value of at least one channel characteristic associated with the first serving cell, or a beam failure associated with the first serving cell.

3. The first network node of claim 2, wherein the at least one channel characteristic comprises at least one of:

a layer 1 reference signal received power, a layer 1 signal to interference plus noise ratio, a rank indicator, a precoding matrix indicator, a channel quality index, or a layer indicator.

4. The first network node of claim 1, wherein the identification of the second machine learning scheme is based at least in part on a specified linkage, of a plurality of specified linkages, that associates the at least one dynamic network change with a specified set of machine learning schemes of the plurality of machine learning schemes, wherein the specified set of machine learning schemes includes the second machine learning scheme.

5. The first network node of claim 4, wherein the at least one dynamic network change comprises at least one of:

a precoder pattern change associated with the second serving cell, a reference signal pattern change associated with the second serving cell, a serving cell identifier (ID) change associated with the second serving cell, or a change of a combination of serving cell IDs associated with the second serving cell.

6. The first network node of claim 1, wherein the first machine learning scheme comprises a first number of kernels corresponding to a convolutional neural network and the second machine learning scheme comprises a second number of kernels corresponding to the convolutional neural network, wherein the first number of kernels is associated with a first bandwidth and the second number of kernels is associated with a second bandwidth, the second bandwidth part comprising the second bandwidth.

7. The first network node of claim 5, wherein the at least one dynamic network change comprises the precoder pattern change associated with the second serving cell, the precoder pattern change comprising a change from a first precoder pattern corresponding to a first transmission configuration indicator (TCI) state ID to a second precoder pattern corresponding to a second TCI state ID, and wherein the first machine learning scheme is associated with the first TCI state ID and the second machine learning scheme is associated with the second TCI state ID.

8. The first network node of claim 5, wherein the at least one dynamic network change comprises the reference signal pattern change associated with the second serving cell, wherein the reference signal pattern change comprises a change from a first reference signal pattern to a second reference signal pattern, wherein the first machine learning scheme is associated with the first reference signal pattern and the second machine learning scheme is associated with the second reference signal pattern.

9. The first network node of claim 5, wherein the at least one dynamic network change comprises the reference signal pattern change associated with the second serving cell, wherein the reference signal pattern change comprises a change from a first reference signal characteristic of a plurality of reference signal characteristics to a second reference signal characteristic of the plurality of reference signal characteristics, wherein the first machine learning scheme is associated with the first reference signal characteristic and the second machine learning scheme is associated with the second reference signal characteristic.

10. The first network node of claim 5, wherein the at least one dynamic network change comprises the serving cell ID change associated with the second serving cell, the serving cell ID change comprising a change from a first serving cell ID a second serving cell ID, and wherein the first machine learning scheme is associated with the first serving cell ID and the second machine learning scheme is associated with the second serving cell ID.

11. The first network node of claim 5, wherein the at least one dynamic network change comprises the change of a combination of serving cell IDs associated with the second serving cell, the change of the combination of serving cell IDs comprising a change from a first combination of serving cell IDs to a second combination of serving cell IDs, and wherein the first machine learning scheme is associated with the first combination of serving cell IDs and the second machine learning scheme is associated with the second combination of serving cell IDs.

12. The first network node of claim 1, wherein the prediction comprises a predicted value of at least one channel characteristic associated with the first serving cell, wherein the at least one dynamic network change comprises a change of a first antenna array structure to a second antenna array structure, wherein the first machine learning scheme is associated with the first antenna array structure and the second machine learning scheme is associated with the second antenna array structure.

13. The first network node of claim 12, wherein the second antenna array structure comprises at least one of:

a number of antenna elements along a specified dimension, a distance between a first antenna element and a second antenna element, or a cross-polarization scheme associated with the second antenna array structure.

14. The first network node of claim 13, wherein the assistance information comprises an indication of a serving cell identifier (ID) change or an indication of a change of a combination of serving cell IDs.

15. The first network node of claim 1, wherein the at least one dynamic network change comprises a change of a channel state information-reference signal (CSI-RS) port grouping pattern associated with the second serving cell, the change of the CSI-RS port grouping pattern comprising a change from a first CSI-RS port grouping pattern to a second CSI-RS port grouping pattern, and wherein the first machine learning scheme is associated with the first CSI-RS port grouping pattern and the second machine learning scheme is associated with the second CSI-RS port grouping pattern.

16. The first network node of claim 1, wherein the at least one dynamic network change comprises a change from a first connection between a first set of channel state information-reference signal (CSI-RS) ports associated with the first serving cell with a second set of CSI-RS ports associated with the second serving cell to a second connection between a third set of CSI-RS ports associated with the first serving cell with a fourth set of CSI-RS ports associated with the second serving cell, and wherein the first machine learning scheme is associated with the first connection and the second machine learning scheme is associated with the second connection.

17. The first network node of claim 16, wherein the assistance information indicates the change from the first connection to the second connection, and wherein the assistance information comprises an indication of at least one of:

the bandwidth part switch associated with the second serving cell, a precoder pattern change associated with the second serving cell, a reference signal pattern change associated with the second serving cell, a serving cell identifier (ID) change associated with the second serving cell, or a change of a combination of serving cell IDs associated with the second serving cell.

18. The first network node of claim 1, wherein the prediction comprises a predicted beam failure associated with the first serving cell.

19. The first network node of claim 18, wherein the dynamic network change comprises a change from a first metric associated with a beam failure detection reference signal (BFD-RS) associated with the first serving cell to a second metric associated with the BFD-RS, and wherein the first machine learning scheme is associated with the first metric and the second machine learning scheme is associated with the second metric.

20. The first network node of claim 19, wherein the one or more processors are further configured to receive an indication of the second metric.

21. The first network node of claim 19, wherein the first metric or the second metric indicates at least one of:

a physical downlink control channel hypothesis block error rate identified based on the BFD-RS, an explicit channel identified based at least in part on the BFD-RS, a precoding matrix indicator identified based at least in part on the BFD-RS, or an interference measurement resource associated with the second serving cell.

22. The first network node of claim 1, wherein a machine learning parameter associated with the machine learning model indicates at least one of:

a weight associated with at least one of a neuron, a kernel, or a layer, a number of neurons in the machine learning model, a number of kernels in the machine learning model, a number of hidden layers in the machine learning model, a dimension of a layer of the machine learning model, a dimension of an input to the machine learning model, a dimension of an output of the machine learning model, an association between an estimated signal and a machine learning model input feature, an association between a machine learning model output feature and a predicted channel state information, or an association between a machine learning model output feature and a predicted beam failure instance.

23. A first network node for wireless communication, comprising:

one or more antennas; and a processing system that includes one or more processors and one or more memories that store code and are coupled with the one or more processors, the processing system configured to cause the first network node to:

transmit, to a second network node, a machine learning configuration associated with a plurality of machine learning schemes, wherein a first machine learning scheme, of the plurality of machine learning schemes, is associated with a first network state and a first numerology, wherein a second machine learning scheme, of the plurality of machine learning schemes, is associated with a second network state and a second numerology, and wherein the plurality of machine learning schemes include a machine learning model for generating a prediction associated with a first serving cell based at least in part on at least one reference signal associated with a second serving cell; and transmit, to the second network node, assistance information indicating an occurrence of a dynamic network change of a set of specified dynamic network changes, wherein the dynamic network change corresponds to a change from the first network state to the second network state, wherein the dynamic network change comprises a bandwidth part switch associated with the second serving cell, wherein the bandwidth part switch comprises a change from a first bandwidth part being active to a second bandwidth part being active, and wherein the second numerology corresponds to the second bandwidth part.

24. The first network node of claim 23, wherein the prediction comprises at least one of:

a predicted value of at least one channel characteristic associated with the first serving cell, or a beam failure associated with the first serving cell.

25. A method of wireless communication performed by a first network node, comprising:

receiving assistance information indicating an occurrence of at least one dynamic network change of a set of dynamic network changes, wherein the at least one dynamic network change corresponds to a change from a first network state to a second network state, wherein a first machine learning scheme, of a plurality of machine learning schemes configured at the first network node, is associated with the first network state and a first numerology, wherein the plurality of machine learning schemes include a machine learning model for generating a prediction associated with a first serving cell based at least in part on at least one reference signal associated with a second serving cell, wherein the at least one dynamic network change comprises a bandwidth part switch associated with the second serving cell, and wherein the bandwidth part switch comprises a change from a first bandwidth part being active to a second bandwidth part being active;

identifying, based at least in part on the assistance information, a second machine learning scheme, from the plurality of machine learning schemes, wherein the second machine learning scheme is associated with the second network state and a second numerology, and wherein the second numerology corresponds to the second bandwidth part; and performing a wireless communication based at least in part on the second machine learning scheme.

26. The method of claim 25, wherein the prediction comprises at least one of:

a predicted value of at least one channel characteristic associated with the first serving cell, or a beam failure associated with the first serving cell.

27. A method of wireless communication performed by a first network node, comprising:

transmitting, to a second network node, a machine learning configuration associated with a plurality of machine learning schemes, wherein a first machine learning scheme, of the plurality of machine learning schemes, is associated with a first network state and a first numerology, wherein a second machine learning scheme, of the plurality of machine learning schemes, is associated with a second network state and a second numerology, and wherein the plurality of machine learning schemes include a machine learning model for generating a prediction associated with a first serving cell based at least in part on at least one reference signal associated with a second serving cell; and transmitting, to the second network node, assistance information indicating an occurrence of a dynamic network change of a set of specified dynamic network changes, wherein the dynamic network change corresponds to a change from the first network state to the second network state, wherein the dynamic network change comprises a bandwidth part switch associated with the second serving cell, wherein the bandwidth part switch comprises a change from a first bandwidth part being active to a second bandwidth part being active, and wherein the second numerology corresponds to the second bandwidth part.

28. The method of claim 27, wherein the prediction comprises at least one of:

a predicted value of at least one channel characteristic associated with the first serving cell, or a beam failure associated with the first serving cell.

29. The method of claim 25, wherein the identification of the second machine learning scheme is based at least in part on a specified linkage, of a plurality of specified linkages, that associates the at least one dynamic network change with a specified set of machine learning schemes of the plurality of machine learning schemes, wherein the specified set of machine learning schemes includes the second machine learning scheme.

30. The method of claim 25, wherein the at least one dynamic network change comprises at least one of:

a precoder pattern change associated with the second serving cell, a reference signal pattern change associated with the second serving cell, a serving cell identifier (ID) change associated with the second serving cell, or a change of a combination of serving cell IDs associated with the second serving cell.

* * * * *